US009107109B2

(12) United States Patent
Lundby et al.

(10) Patent No.: US 9,107,109 B2
(45) Date of Patent: *Aug. 11, 2015

(54) METHOD AND APPARATUS FOR DETERMINING A DATA RATE IN A HIGH RATE PACKET DATA WIRELESS COMMUNICATIONS SYSTEM

(75) Inventors: Stein A. Lundby, Solana Beach, CA (US); Leonid Razoumov, San Diego, CA (US); Gang Bao, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2140 days.

This patent is subject to a terminal disclaimer.

(21) Appl. No.: 11/165,882

(22) Filed: Jun. 24, 2005

(65) Prior Publication Data

US 2005/0254465 A1 Nov. 17, 2005

Related U.S. Application Data

(63) Continuation of application No. 09/697,372, filed on Oct. 25, 2000, now Pat. No. 6,973,098.

(51) Int. Cl.
*H04J 1/16* (2006.01)
*H04L 1/00* (2006.01)
(Continued)

(52) U.S. Cl.
CPC ............. *H04W 28/22* (2013.01); *H04L 1/0002* (2013.01); *H04W 52/16* (2013.01); *H04W 52/286* (2013.01); *H04W 52/346* (2013.01);
(Continued)

(58) Field of Classification Search
USPC .......................... 370/491, 500, 346, 437, 439
See application file for complete search history.

(56) References Cited

U.S. PATENT DOCUMENTS

| 3,018,663 A | 1/1962 | Dunlop |
| 3,534,264 A | 10/1970 | Blasbalg et al. |

(Continued)

FOREIGN PATENT DOCUMENTS

| BR | 9607900 A | 1/1998 |
| BR | 9607621 A | 6/1998 |

(Continued)

OTHER PUBLICATIONS

3rd Generation Partnership Project, Technical Specification Group Radio Access Network 25.101. Section 9.3, User Equipment (UE) Radio Transmission and Reception (FDD). (Release 6). Dec. 2005.

(Continued)

*Primary Examiner* — Phuc H Tran
(74) *Attorney, Agent, or Firm* — Dalei Dong

(57) ABSTRACT

In a wireless communication system a method for combination transmission of packet data and low delay data. In one embodiment a parallel signaling channel provides a message to receivers indicating a target recipient of packet data. The message also identifies the transmission channels used for packet data transmissions. Each receiver may then selectively decode only packets where the message identifies the receiver as a target recipient. The data packets stored in a buffer are ignored if the target recipient is another mobile unit. In one embodiment, the message is sent concurrently with the data packet on a parallel channel. In one embodiment, the message is punctured into the high rate packet data transmission.

12 Claims, 10 Drawing Sheets

(51) Int. Cl.
*H04W 28/22* (2009.01)
*H04W 52/16* (2009.01)
*H04W 52/28* (2009.01)
*H04W 52/34* (2009.01)
*H04W 52/26* (2009.01)
*H04W 52/32* (2009.01)

(52) U.S. Cl.
CPC ............ *H04L1/0026* (2013.01); *H04W 52/267* (2013.01); *H04W 52/325* (2013.01)

(56) References Cited

U.S. PATENT DOCUMENTS

| | | | |
|---|---|---|---|
| 4,047,151 A | 9/1977 | Rydbeck et al. | |
| 4,131,765 A | 12/1978 | Kahn | |
| 4,256,925 A | 3/1981 | Goode | |
| 4,261,054 A | 4/1981 | Scharla-Nielsen | |
| 4,309,764 A | 1/1982 | Acampora | |
| 4,383,315 A | 5/1983 | Torng | |
| 4,491,947 A | 1/1985 | Frank | |
| 4,495,619 A | 1/1985 | Acampora | |
| 4,495,648 A | 1/1985 | Giger | |
| 4,547,880 A | 10/1985 | De Vita et al. | |
| 4,675,863 A | 6/1987 | Paneth et al. | |
| 4,720,829 A | 1/1988 | Fukasawa et al. | |
| 4,756,007 A | 7/1988 | Qureshi et al. | |
| 4,785,450 A | 11/1988 | Bolgiano et al. | |
| 4,789,983 A | 12/1988 | Acampora et al. | |
| 4,817,089 A | 3/1989 | Paneth et al. | |
| 4,901,307 A | 2/1990 | Gilhousen et al. | |
| 4,901,319 A | 2/1990 | Ross | |
| 4,910,794 A | 3/1990 | Mahany | |
| 4,914,651 A | 4/1990 | Lusignan | |
| 4,931,250 A | 6/1990 | Greszczuk | |
| 4,939,731 A | 7/1990 | Reed et al. | |
| 4,991,184 A | 2/1991 | Hashimoto | |
| 5,003,534 A | 3/1991 | Gerhardt et al. | |
| 5,022,046 A | 6/1991 | Morrow, Jr. et al. | |
| 5,038,399 A | 8/1991 | Bruckert | |
| 5,056,109 A | 10/1991 | Gilhousen et al. | |
| 5,093,924 A | 3/1992 | Toshiyuki et al. | |
| 5,101,501 A | 3/1992 | Gilhousen et al. | |
| 5,103,459 A | 4/1992 | Gilhousen et al. | |
| 5,115,429 A | 5/1992 | Hluchyj et al. | |
| 5,191,583 A | 3/1993 | Pearson et al. | |
| 5,204,876 A | 4/1993 | Bruckert et al. | |
| 5,235,614 A | 8/1993 | Bruckert et al. | |
| 5,267,261 A | 11/1993 | Blakeney, II et al. | |
| 5,267,262 A | 11/1993 | Wheatley, III | |
| 5,276,261 A | 1/1994 | Mayer et al. | |
| 5,280,472 A | 1/1994 | Gilhousen et al. | |
| 5,280,537 A | 1/1994 | Sugiyama et al. | |
| 5,289,527 A | 2/1994 | Tiedemann, Jr. | |
| 5,297,192 A | 3/1994 | Gerszberg | |
| 5,305,308 A | 4/1994 | English et al. | |
| 5,307,351 A | 4/1994 | Webster | |
| 5,317,123 A | 5/1994 | Ito et al. | |
| 5,343,513 A | 8/1994 | Kay et al. | |
| 5,373,502 A | 12/1994 | Turban | |
| 5,375,123 A | 12/1994 | Andersson et al. | |
| 5,383,219 A | 1/1995 | Wheatley, III et al. | |
| 5,386,589 A | 1/1995 | Kanai | |
| 5,396,516 A | 3/1995 | Padovani et al. | |
| 5,400,328 A | 3/1995 | Burren et al. | |
| 5,404,376 A | 4/1995 | Dent | |
| 5,412,687 A | 5/1995 | Sutton et al. | |
| 5,414,796 A | 5/1995 | Jacobs et al. | |
| 5,416,797 A | 5/1995 | Gilhousen et al. | |
| 5,425,051 A | 6/1995 | Mahany | |
| 5,434,860 A | 7/1995 | Riddle | |
| 5,442,625 A | 8/1995 | Gitlin et al. | |
| 5,459,727 A | 10/1995 | Vannucci | |
| 5,461,639 A | 10/1995 | Wheatley, III et al. | |
| 5,465,388 A | 11/1995 | Zicker | |
| 5,469,471 A | 11/1995 | Wheatley, III et al. | |
| 5,485,486 A | 1/1996 | Gilhousen et al. | |
| 5,491,837 A | 2/1996 | Haartsen | |
| 5,497,395 A | 3/1996 | Jou et al. | |
| 5,504,773 A | 4/1996 | Padovani et al. | |
| 5,528,593 A | 6/1996 | English et al. | |
| 5,530,693 A | 6/1996 | Averbuch et al. | |
| 5,530,700 A | 6/1996 | Tran et al. | |
| 5,533,004 A | 7/1996 | Jasper et al. | |
| 5,535,239 A | 7/1996 | Padovani et al. | |
| 5,537,410 A | 7/1996 | Li | |
| 5,559,789 A | 9/1996 | Nakano et al. | |
| 5,564,080 A | 10/1996 | Eul et al. | |
| 5,566,175 A | 10/1996 | Davis | |
| 5,568,483 A | 10/1996 | Padovani et al. | |
| 5,577,022 A | 11/1996 | Padovani et al. | |
| 5,577,087 A | 11/1996 | Furuya | |
| 5,579,306 A | 11/1996 | Dent | |
| 5,594,720 A | 1/1997 | Papadopoulos et al. | |
| 5,594,949 A | 1/1997 | Andersson et al. | |
| 5,603,093 A | 2/1997 | Yoshimi et al. | |
| 5,604,730 A | 2/1997 | Tiedemann, Jr. et al. | |
| 5,612,948 A | 3/1997 | Fette et al. | |
| 5,621,723 A | 4/1997 | Walton, Jr. et al. | |
| 5,621,752 A | 4/1997 | Antonio et al. | |
| 5,634,195 A | 5/1997 | Sawyer | |
| 5,638,412 A | 6/1997 | Blakeney, II et al. | |
| 5,648,955 A | 7/1997 | Jensen et al. | |
| 5,649,290 A | 7/1997 | Wang et al. | |
| 5,654,979 A | 8/1997 | Levin et al. | |
| 5,666,649 A | 9/1997 | Dent et al. | |
| 5,680,395 A | 10/1997 | Weaver et al. | |
| 5,682,605 A | 10/1997 | Salter | |
| 5,697,053 A | 12/1997 | Hanly et al. | |
| 5,699,365 A | 12/1997 | Klayman et al. | |
| 5,701,294 A | 12/1997 | Ward et al. | |
| 5,706,145 A | 1/1998 | Hindman et al. | |
| 5,710,768 A | 1/1998 | Ziv et al. | |
| 5,710,974 A | 1/1998 | Granlund et al. | |
| 5,726,978 A | 3/1998 | Frodigh et al. | |
| 5,729,557 A | 3/1998 | Gardner et al. | |
| 5,734,646 A | 3/1998 | I et al. | |
| 5,734,647 A | 3/1998 | Yoshida et al. | |
| 5,745,480 A | 4/1998 | Behtash et al. | |
| 5,748,677 A | 5/1998 | Kumar | |
| 5,751,725 A | 5/1998 | Chen | |
| 5,757,367 A | 5/1998 | Kapoor | |
| 5,757,810 A | 5/1998 | Fall | |
| 5,764,687 A | 6/1998 | Easton | |
| 5,764,699 A | 6/1998 | Needham et al. | |
| 5,764,899 A | 6/1998 | Eggleston et al. | |
| 5,768,533 A | 6/1998 | Ran | |
| 5,771,226 A | 6/1998 | Kaku et al. | |
| 5,771,451 A | 6/1998 | Takai et al. | |
| 5,771,461 A | 6/1998 | Love et al. | |
| 5,774,809 A | 6/1998 | Tuutijarvi et al. | |
| 5,781,539 A | 7/1998 | Tanaka | |
| 5,781,583 A | 7/1998 | Bruckert et al. | |
| 5,787,133 A | 7/1998 | Marchetto et al. | |
| 5,793,759 A | 8/1998 | Rakib et al. | |
| 5,794,129 A | 8/1998 | Komatsu | |
| 5,799,005 A | 8/1998 | Soliman | |
| 5,802,046 A | 9/1998 | Scott | |
| 5,805,581 A | 9/1998 | Uchida et al. | |
| 5,805,585 A | 9/1998 | Javitt et al. | |
| 5,812,938 A | 9/1998 | Gilhousen et al. | |
| 5,822,315 A | 10/1998 | De Seze et al. | |
| 5,822,318 A | 10/1998 | Tiedemann, Jr. et al. | |
| 5,822,358 A | 10/1998 | Johansen et al. | |
| 5,822,359 A | 10/1998 | Bruckert et al. | |
| 5,825,761 A | 10/1998 | Tanaka et al. | |
| 5,832,368 A | 11/1998 | Nakano et al. | |
| 5,835,508 A | 11/1998 | Kushita | |
| 5,842,113 A | 11/1998 | Nanda et al. | |
| 5,845,212 A | 12/1998 | Tanaka et al. | |
| 5,848,357 A | 12/1998 | Dehner | |
| 5,850,605 A | 12/1998 | Souissi et al. | |
| 5,857,147 A | 1/1999 | Gardner et al. | |
| 5,862,132 A | 1/1999 | Blanchard et al. | |
| 5,862,453 A | 1/1999 | Love et al. | |

(56) References Cited

U.S. PATENT DOCUMENTS

| | | | |
|---|---|---|---|
| 5,870,393 A | 2/1999 | Yano et al. | |
| 5,872,775 A * | 2/1999 | Saints et al. | 370/342 |
| 5,878,038 A | 3/1999 | Willey | |
| 5,883,887 A | 3/1999 | Take et al. | |
| 5,896,561 A | 4/1999 | Schrader et al. | |
| 5,901,142 A | 5/1999 | Averbuch et al. | |
| 5,903,554 A | 5/1999 | Saints | |
| 5,914,950 A | 6/1999 | Chen et al. | |
| 5,914,959 A | 6/1999 | Marchetto et al. | |
| 5,918,184 A | 6/1999 | Wang et al. | |
| 5,920,551 A | 7/1999 | Na et al. | |
| 5,923,650 A | 7/1999 | Chen et al. | |
| 5,930,288 A | 7/1999 | Eberhardt | |
| 5,933,421 A | 8/1999 | Alamouti et al. | |
| 5,933,462 A | 8/1999 | Viterbi et al. | |
| 5,933,787 A | 8/1999 | Gilhousen et al. | |
| 5,937,002 A | 8/1999 | Andersson et al. | |
| 5,937,357 A | 8/1999 | Tanaka | |
| 5,940,765 A | 8/1999 | Haartsen | |
| 5,943,327 A | 8/1999 | Mademann et al. | |
| 5,943,329 A | 8/1999 | Ohgoshi et al. | |
| 5,943,331 A | 8/1999 | Lavean | |
| 5,946,346 A | 8/1999 | Ahmed et al. | |
| 5,946,356 A | 8/1999 | Felix et al. | |
| 5,946,621 A | 8/1999 | Chheda et al. | |
| 5,950,124 A | 9/1999 | Trompower et al. | |
| 5,953,325 A | 9/1999 | Willars | |
| 5,956,642 A | 9/1999 | Larsson | |
| 5,960,350 A | 9/1999 | Schorman et al. | |
| 5,963,548 A | 10/1999 | Virtanen | |
| 5,966,384 A | 10/1999 | Felix et al. | |
| 5,974,106 A | 10/1999 | Dupont | |
| 5,978,657 A | 11/1999 | Suzuki | |
| 5,991,627 A | 11/1999 | Honkasalo et al. | |
| 6,002,919 A | 12/1999 | Posti | |
| 6,005,856 A | 12/1999 | Jensen et al. | |
| 6,026,081 A | 2/2000 | Hamabe | |
| 6,028,852 A | 2/2000 | Miya et al. | |
| 6,038,263 A | 3/2000 | Kotzin et al. | |
| 6,052,594 A | 4/2000 | Chuang et al. | |
| 6,067,324 A * | 5/2000 | Harrison | 375/267 |
| 6,069,884 A | 5/2000 | Hayashi et al. | |
| 6,073,025 A | 6/2000 | Chheda et al. | |
| 6,088,324 A | 7/2000 | Sato | |
| 6,088,335 A | 7/2000 | I et al. | |
| 6,091,737 A | 7/2000 | Hong et al. | |
| 6,091,757 A | 7/2000 | Cudak et al. | |
| 6,097,704 A | 8/2000 | Jackson et al. | |
| 6,101,394 A | 8/2000 | Illidge | |
| 6,112,084 A | 8/2000 | Sicher et al. | |
| 6,134,220 A | 10/2000 | Le Strat et al. | |
| 6,137,789 A | 10/2000 | Honkasalo et al. | |
| 6,137,839 A | 10/2000 | Mannering et al. | |
| 6,137,991 A | 10/2000 | Isaksson | |
| 6,151,502 A | 11/2000 | Padovani et al. | |
| 6,161,013 A | 12/2000 | Anderson et al. | |
| 6,163,707 A | 12/2000 | Miller | |
| 6,167,031 A | 12/2000 | Oloffson et al. | |
| 6,173,005 B1 | 1/2001 | Kotzin et al. | |
| 6,173,007 B1 | 1/2001 | Odenwalder et al. | |
| 6,174,558 B1 | 1/2001 | Lamptey et al. | |
| 6,175,448 B1 | 1/2001 | Xie et al. | |
| 6,175,550 B1 | 1/2001 | Van Nee | |
| 6,175,558 B1 | 1/2001 | Miya | |
| 6,175,590 B1 | 1/2001 | Stein | |
| 6,178,448 B1 | 1/2001 | Gray et al. | |
| 6,179,007 B1 | 1/2001 | Cote et al. | |
| 6,188,906 B1 | 2/2001 | Lim et al. | |
| 6,189,122 B1 | 2/2001 | Cheng | |
| 6,212,176 B1 | 4/2001 | Andersson et al. | |
| 6,212,988 B1 | 4/2001 | Chernyshov et al. | |
| 6,215,988 B1 | 4/2001 | Matero | |
| 6,219,343 B1 | 4/2001 | Honkasalo et al. | |
| 6,222,832 B1 | 4/2001 | Proctor et al. | |
| 6,222,875 B1 | 4/2001 | Dahlman et al. | |
| 6,233,231 B1 | 5/2001 | Felix et al. | |
| 6,236,365 B1 | 5/2001 | LeBlanc et al. | |
| 6,263,205 B1 | 7/2001 | Yamaura et al. | |
| 6,266,339 B1 | 7/2001 | Donahue et al. | |
| 6,269,088 B1 | 7/2001 | Masui et al. | |
| 6,272,124 B1 | 8/2001 | Ahn et al. | |
| 6,285,655 B1 | 9/2001 | Lundby et al. | |
| 6,285,886 B1 | 9/2001 | Kamel et al. | |
| 6,307,844 B1 | 10/2001 | Tsunehara et al. | |
| 6,307,851 B1 | 10/2001 | Jung et al. | |
| 6,308,072 B1 | 10/2001 | Labedz et al. | |
| 6,317,413 B1 | 11/2001 | Honkasalo et al. | |
| 6,317,435 B1 | 11/2001 | Tiedemann, Jr. et al. | |
| 6,320,851 B1 | 11/2001 | Kim et al. | |
| 6,335,922 B1 | 1/2002 | Tiedemann, Jr. et al. | |
| 6,347,217 B1 | 2/2002 | Bengtsson et al. | |
| 6,356,555 B1 | 3/2002 | Rakib et al. | |
| 6,366,778 B1 | 4/2002 | Bender et al. | |
| 6,377,809 B1 | 4/2002 | Rezaiifar et al. | |
| 6,389,066 B1 | 5/2002 | Ejzak | |
| 6,393,005 B1 | 5/2002 | Mimura et al. | |
| 6,400,695 B1 | 6/2002 | Chuah et al. | |
| 6,434,367 B1 | 8/2002 | Kumar et al. | |
| 6,434,380 B1 | 8/2002 | Andersson et al. | |
| 6,434,637 B1 | 8/2002 | D'Errico et al. | |
| 6,438,115 B1 | 8/2002 | Mazur et al. | |
| 6,445,908 B1 | 9/2002 | Glazko | |
| 6,456,652 B1 | 9/2002 | Kim et al. | |
| 6,470,024 B1 | 10/2002 | Hamalainen et al. | |
| 6,470,044 B1 | 10/2002 | Kowalski | |
| 6,483,825 B2 | 11/2002 | Seta | |
| 6,487,259 B1 | 11/2002 | Russo | |
| 6,496,543 B1 | 12/2002 | Zehavi | |
| 6,501,958 B1 | 12/2002 | Hwang et al. | |
| 6,512,925 B1 | 1/2003 | Chen et al. | |
| 6,545,986 B1 | 4/2003 | Stellakis | |
| 6,563,809 B1 | 5/2003 | Proctor et al. | |
| 6,567,374 B1 | 5/2003 | Bohnke et al. | |
| 6,567,461 B1 | 5/2003 | Moon et al. | |
| 6,570,860 B2 | 5/2003 | Hamalainen et al. | |
| 6,574,211 B2 | 6/2003 | Padovani et al. | |
| 6,574,266 B1 | 6/2003 | Haartsen | |
| 6,574,267 B1 | 6/2003 | Kanterakis et al. | |
| 6,577,618 B2 | 6/2003 | Diachina et al. | |
| 6,580,899 B1 | 6/2003 | Dalgleish et al. | |
| 6,590,873 B1 | 7/2003 | Li et al. | |
| 6,606,311 B1 | 8/2003 | Wang et al. | |
| 6,615,052 B1 | 9/2003 | Parmenter | |
| 6,621,804 B1 | 9/2003 | Holtzman et al. | |
| 6,625,433 B1 | 9/2003 | Poirier et al. | |
| 6,636,496 B1 | 10/2003 | Cho et al. | |
| 6,643,520 B1 * | 11/2003 | Park et al. | 455/522 |
| 6,668,159 B1 | 12/2003 | Olofsson et al. | |
| 6,711,150 B1 | 3/2004 | Vanghi | |
| 6,711,415 B1 | 3/2004 | McCarthy | |
| 6,717,926 B1 | 4/2004 | Deboille et al. | |
| 6,725,043 B2 | 4/2004 | Bonta et al. | |
| 6,728,233 B1 * | 4/2004 | Park et al. | 370/342 |
| 6,757,270 B1 | 6/2004 | Kumar et al. | |
| 6,760,587 B2 | 7/2004 | Holtzman et al. | |
| 6,804,214 B1 | 10/2004 | Lundh et al. | |
| 6,810,030 B1 | 10/2004 | Kuo | |
| 6,834,047 B1 | 12/2004 | Yoon et al. | |
| 6,850,506 B1 | 2/2005 | Holtzman et al. | |
| 6,859,446 B1 | 2/2005 | Gopalakrishnan et al. | |
| 6,894,994 B1 | 5/2005 | Grob | |
| 6,898,437 B1 | 5/2005 | Larsen et al. | |
| 6,912,228 B1 | 6/2005 | Dahlman et al. | |
| 6,917,808 B1 * | 7/2005 | Nelson | 455/436 |
| 6,971,098 B2 | 11/2005 | Khare et al. | |
| 6,973,062 B1 | 12/2005 | Han | |
| 6,973,098 B1 * | 12/2005 | Lundby et al. | 370/491 |
| 6,975,604 B1 | 12/2005 | Ishida et al. | |
| 7,002,920 B1 | 2/2006 | Ayyagari et al. | |
| 7,016,649 B1 | 3/2006 | Narasimhan et al. | |
| 7,068,683 B1 | 6/2006 | Lundby et al. | |
| 7,072,321 B2 | 7/2006 | Holtzman et al. | |
| 7,072,322 B2 | 7/2006 | Holtzman et al. | |
| 7,079,550 B2 | 7/2006 | Padovani et al. | |

(56) References Cited

U.S. PATENT DOCUMENTS

| | | |
|---|---|---|
| 7,133,460 B2 | 11/2006 | Bae et al. |
| 7,154,846 B2 | 12/2006 | Chen et al. |
| 7,184,426 B2 | 2/2007 | Padovani et al. |
| 7,194,006 B2 | 3/2007 | Wong et al. |
| 7,289,473 B1 | 10/2007 | Padovani et al. |
| 7,349,714 B2 | 3/2008 | Lee et al. |
| 7,397,767 B2 | 7/2008 | Taffin et al. |
| 7,499,427 B2 | 3/2009 | Padovani et al. |
| 7,848,282 B2 | 12/2010 | Padovani et al. |
| 7,848,283 B2 | 12/2010 | Padovani et al. |
| 7,848,284 B2 | 12/2010 | Padovani et al. |
| 7,848,285 B2 | 12/2010 | Padovani et al. |
| 7,995,531 B2 | 8/2011 | Padovani et al. |
| 8,005,042 B2 | 8/2011 | Padovani et al. |
| 8,009,625 B2 | 8/2011 | Padovani et al. |
| 8,064,409 B1 | 11/2011 | Gardner et al. |
| 8,068,453 B2 | 11/2011 | Holtzman et al. |
| 8,077,655 B2 | 12/2011 | Padovani et al. |
| 8,089,924 B2 | 1/2012 | Padovani et al. |
| 8,102,882 B2 | 1/2012 | Wang et al. |
| 8,189,540 B2 | 5/2012 | Padovani et al. |
| 2001/0033558 A1 | 10/2001 | Matsuki et al. |
| 2001/0046879 A1 | 11/2001 | Schramm et al. |
| 2002/0097697 A1 | 7/2002 | Bae et al. |
| 2002/0160781 A1 | 10/2002 | Bark et al. |
| 2002/0196768 A1 | 12/2002 | Ohgoshi et al. |
| 2003/0002490 A1 | 1/2003 | Wong et al. |
| 2004/0224719 A1 | 11/2004 | Nounin et al. |
| 2005/0026642 A1 | 2/2005 | Lee et al. |
| 2005/0254465 A1 | 11/2005 | Lundby et al. |
| 2006/0187877 A1 | 8/2006 | Lundby et al. |
| 2006/0280160 A1 | 12/2006 | Padovani et al. |
| 2007/0025267 A1 | 2/2007 | Padovani et al. |
| 2008/0008136 A1 | 1/2008 | Padovani et al. |
| 2008/0101303 A1 | 5/2008 | Kim |
| 2008/0298382 A1 | 12/2008 | Galli et al. |
| 2008/0318562 A1 | 12/2008 | Featherstone et al. |
| 2009/0310588 A1 | 12/2009 | Padovani et al. |
| 2010/0023644 A1 | 1/2010 | Laffra et al. |
| 2010/0323748 A1 | 12/2010 | Padovani et al. |
| 2011/0069629 A1 | 3/2011 | Breit et al. |
| 2012/0033628 A1 | 2/2012 | Eriksson et al. |
| 2013/0094391 A1 | 4/2013 | Padovani et al. |

FOREIGN PATENT DOCUMENTS

| | | |
|---|---|---|
| CA | 2427007 | 6/2002 |
| CA | 2239524 | 8/2002 |
| CN | 1144444 A | 3/1997 |
| CN | 1256817 | 6/2000 |
| CN | 1262825 A | 8/2000 |
| CN | 1269934 A | 10/2000 |
| CN | 1301475 A | 6/2001 |
| CN | 101523748 A | 9/2009 |
| DE | 19913086 | 10/2000 |
| EP | 0353759 | 2/1990 |
| EP | 0353759 A2 | 2/1990 |
| EP | 0412583 | 2/1991 |
| EP | 0418865 | 3/1991 |
| EP | 0600713 | 8/1994 |
| EP | 0656716 | 6/1995 |
| EP | 0656716 A1 | 6/1995 |
| EP | 0716520 | 6/1996 |
| EP | 0720407 A2 | 7/1996 |
| EP | 0729240 A2 | 8/1996 |
| EP | 0762703 A1 | 3/1997 |
| EP | 0767548 | 4/1997 |
| EP | 0767548 A2 | 4/1997 |
| EP | 0779755 | 6/1997 |
| EP | 0847147 A2 | 6/1998 |
| EP | 0847147 | 7/1998 |
| EP | 0887947 | 12/1998 |
| EP | 0899906 A2 | 3/1999 |
| EP | 0924878 | 6/1999 |
| EP | 0936753 | 6/1999 |
| EP | 0977371 A2 | 2/2000 |
| EP | 1022862 | 7/2000 |
| GB | 715435 A | 9/1954 |
| GB | 2293947 | 4/1996 |
| GB | 2303769 A | 2/1997 |
| GB | 2311702 | 10/1997 |
| JP | 57-159148 | 10/1982 |
| JP | 59-039150 | 3/1984 |
| JP | 63-184420 | 7/1988 |
| JP | 63-252047 | 10/1988 |
| JP | 01-170147 | 4/1989 |
| JP | 01-122242 | 5/1989 |
| JP | 02035848 | 2/1990 |
| JP | 03-060251 | 3/1991 |
| JP | 05276132 | 10/1993 |
| JP | 6318927 | 11/1994 |
| JP | H08149176 A | 6/1996 |
| JP | H08506715 A | 7/1996 |
| JP | 8274756 A | 10/1996 |
| JP | 8335829 | 12/1996 |
| JP | 09008770 | 1/1997 |
| JP | H0936801 A | 2/1997 |
| JP | 09-83600 | 3/1997 |
| JP | 9074378 | 3/1997 |
| JP | H0983484 A | 3/1997 |
| JP | 09093652 | 4/1997 |
| JP | 9186646 | 7/1997 |
| JP | 9191276 A | 7/1997 |
| JP | 9200825 A | 7/1997 |
| JP | 1051354 | 2/1998 |
| JP | 10-107769 | 4/1998 |
| JP | 10098763 | 4/1998 |
| JP | 10107769 A | 4/1998 |
| JP | 10155179 A | 6/1998 |
| JP | 63141432 | 6/1998 |
| JP | 10190625 | 7/1998 |
| JP | 10285138 | 10/1998 |
| JP | H11046196 A | 2/1999 |
| JP | 11098574 A | 4/1999 |
| JP | 11154904 | 6/1999 |
| JP | 11234202 | 8/1999 |
| JP | 11284570 | 10/1999 |
| JP | 8125604 | 1/2000 |
| JP | 2000091985 | 3/2000 |
| JP | 2000165927 A | 6/2000 |
| JP | 2000-224231 | 8/2000 |
| JP | 00224231 A | 8/2000 |
| JP | 2002050984 A | 2/2002 |
| JP | 2002152849 | 5/2005 |
| JP | 2007335994 A | 12/2007 |
| JP | 2008099317 A | 4/2008 |
| JP | 4339508 | 7/2009 |
| JP | 4382868 | 10/2009 |
| JP | 4594442 | 12/2010 |
| JP | 4594443 | 12/2010 |
| JP | 2011035828 A | 2/2011 |
| KR | 2000-0011799 | 2/2000 |
| RU | 2139636 C1 | 10/1999 |
| RU | 2146850 | 3/2000 |
| SU | 462292 | 2/1975 |
| SU | 1585902 | 11/1988 |
| WO | 9222162 | 12/1992 |
| WO | 9418771 | 8/1994 |
| WO | WO9428643 | 12/1994 |
| WO | 9500821 | 1/1995 |
| WO | WO9503652 A1 | 2/1995 |
| WO | 9507578 | 3/1995 |
| WO | WO9512938 A1 | 5/1995 |
| WO | WO-9516319 A1 | 6/1995 |
| WO | 9528814 | 10/1995 |
| WO | WO9600466 A1 | 1/1996 |
| WO | WO9608908 | 3/1996 |
| WO | 9610320 | 4/1996 |
| WO | 9631013 A1 | 10/1996 |
| WO | 9709810 | 3/1997 |
| WO | 9711535 | 3/1997 |
| WO | 9715131 | 4/1997 |
| WO | WO-9730519 A2 | 8/1997 |

(56) References Cited

FOREIGN PATENT DOCUMENTS

| | | |
|---|---|---|
| WO | 9737456 A2 | 10/1997 |
| WO | 9740592 | 10/1997 |
| WO | WO9737443 A1 | 10/1997 |
| WO | WO9819405 | 5/1998 |
| WO | 9835514 | 8/1998 |
| WO | WO-9838757 A1 | 9/1998 |
| WO | 9852307 | 11/1998 |
| WO | WO9852327 A2 | 11/1998 |
| WO | 9859451 | 12/1998 |
| WO | WO9859443 A1 | 12/1998 |
| WO | WO9859449 | 12/1998 |
| WO | WO9903225 | 1/1999 |
| WO | 99/14975 A2 | 3/1999 |
| WO | 9918684 | 4/1999 |
| WO | WO9918702 | 4/1999 |
| WO | 99/23844 A2 | 5/1999 |
| WO | 9923844 | 5/1999 |
| WO | WO9923844 | 5/1999 |
| WO | WO9943101 | 8/1999 |
| WO | WO9949588 | 9/1999 |
| WO | 9950977 A1 | 10/1999 |
| WO | WO9966744 A1 | 12/1999 |
| WO | WO0004728 | 1/2000 |
| WO | 0008706 | 2/2000 |
| WO | 00/14908 A1 | 3/2000 |
| WO | WO0014899 | 3/2000 |
| WO | WO0033472 A1 | 6/2000 |
| WO | WO0033480 | 6/2000 |
| WO | 00/41542 A2 | 7/2000 |
| WO | 0041542 | 7/2000 |
| WO | 0041543 | 7/2000 |
| WO | 0042804 A1 | 7/2000 |
| WO | WO0042810 | 7/2000 |
| WO | 01/52425 A2 | 7/2001 |
| WO | 0152425 | 7/2001 |
| WO | 0180445 | 10/2001 |
| WO | 0235735 | 5/2002 |
| WO | 2008018761 A2 | 2/2008 |
| WO | WO2008051466 A2 | 5/2008 |
| WO | WO2008054099 A1 | 5/2008 |

OTHER PUBLICATIONS

3rd Generation Partnership Project, Technical Specification Group Radio Access Network 25.214, Section 6A.2. Physical Layer Procedures (FDD). (Release 6). Dec. 2005.

International Search Report—International Search Authority—PCT/US01/50895—Nov. 11, 2002.

International Search Report—International Search Authority—PCT/US2001/050892—Oct. 10, 2002.

"CDMA2000 High Rate Packet Data Air Interface Specification," C.S0024 Version 2.0, Published Oct. 27, 2000 by 3rd Generation Partnership Project 2. Section 8.2.1.3.3.2, 8.2.1.3.3.3, 9.2.1.3.3.2.9. 2.3.3.3.

Lagarde, P, et al., "The PR4GVHF ECCM System: Extensive Tactical Communications for the Battlefield" Military Communications Conference, 1992. MILCOM 1992, Conference Record. Communications—Fusing Command, Control and Intellegence., IEEE San Diego, CA USA Oct. 11-14, 1992, New York, NY USA, IEEE, US, Oct. 11, 1992, pp. 662-666, XPO010060937.

European Search Report—EP4007815—May 12, 2005.
European Search Report—EP07003035—Sep. 26, 2007.
European Search Report—EP07003036—Oct. 4, 2007.
European Search Report—EP07003037—Sep. 18, 2007.
European Search Report—EP07003038—Oct. 4, 2007.
Adachi, F. et al., "Wideband multi-rate DS-CDMA for next generation mobile communications systems," Wireless Communications Conference, 1997, Proceedings, Aug. 11-13, 1997, pp. 57-62.
Ariyavisitakul, et al.: "Network Synchronization of Radio Networks in Wireless Personal Communications", Electronic Letters 28(25): 2312-2314 (1992).

Kinsely, D.N et al. CDMA 2000: "A Third-Generation Radio Transmission Technology," Bell Labs Technical Journal, Bell Laboratories, US, vol. 3, No. 3, Jul. 1, 1998, pp. 83-78.

Eng et al: "Comparison of Hybrid FDMA/CDMA in Frequency Selective Rayleigh Fading" IEEE J. of Selected Areas of Communications 12(5): 938-951 (1994).

Foerster et al: "Analysis of Hybrid Coherent FDMA/CDMA Systems in Ricean Multipath Fading" IEEE Transactions on Communications 45(1): 15-18 (1997).

Goodman, et al.: "Quality of service and bandwith efficiency of cellular mobile radio with variable bit-rate speech transmission", IEEE Trans. On Vehicular Technology, Aug. 1983, vol. VT-32, No. 3. pp. 211-217.

Harper, R.C., "Adaptive Phase and Amoiitude Modulation on a Frequency Dispersive Fading Channel", IEEE Transactions on Communications, vol. Com-22, No. 6, Jun. 1974.

Haykin: "An Introduction to Analog and Digital Communications" 1989, John Wiley and Sons, Inc., p. 558.

J. M. Jacobsmeyer, "Adaptive Trellis Coded Modutation for Bandlimited Meteor Burst Channels", 1989 IEEE Military Communications Conference (MILCOM '89), vol. 2, pp. 418-422 (Cat. No. 89CH2681-5).

Jacobsmyer, J.M., "An Adaptive Modulation Scheme for Bandwidth-Limited Meteor-Burst Chnnels" 21st Century Military Communications—What's Possible?, San Diego, Oct. 23-26, 1988, vol. 3, Oct. 23, 1988, pp. 933-937 IEEE.

Jalali et al: "Performance Comparison of Direct Spread and Multicarrier CDMA Systems" IEEE: 2042-2046 (1998).

Kim et al: "The Performance improvement of a Multicarrier DS-CDMA System Using Both Tim-Diversity and Frequency Offset" ETRI J.21(4): 29-40 (1999).

Kondo et al: "Performance of Multicarrier DS CDMA Systems" IEEE Transactions on Communications 44(2):238-246 (1996).

Lee et al: "Direct Sequence Spread Spectrum Walsh-QPSK Modulation" IEEE Transactions on Communications 46(9): 1227-1232 (1998).

Lee et al: "Performance of a Modified Muiticarder Direct Sequence CDMA System" ETRI J.19(1): 1-11 (1997).

Ling, Fuyun "A Matched Filter Bound Analysis of Single and Multi-Carrier DS CDMA Communications" 1997 Asia Pacific Microwave Conference pp. 161-164.

Massoumi, et al.: "Adaptive Trellis Code Modulation for Mobile Communications", IEEE Pacific Rim Conference on Communications, Computers and Signal Processing, May 9-10, 1991.

Rowitch, et al: "Coded Multicarrier DS-CDMA in the Presence of Partial Band Interference" IEEE pp. 204-209 (1996).

Xu et al: "On the Performance of Multicarrier RAKE Systems" IEEE pp. 295-299 (1997).

Xu et al: "Performance of Muiticarrier DS CDMA Systems in the Presence of Correlated Fading" IEEE pp. 2050-2054 (1997).

Ziemer et al: "Effect of Correlation Between Subcarriers of an MCM/DSSS Communication System" IEEE pp. 146-150 (1996).

TIA/EIS/-95-; "Mobile Station-Base Station Compatibility Standard for Dual-Mode Wideband Spread Spectrum Cellular System", Jul. 1993.

Written Opinion—PCT/US01/050895—International Search Authority—European Patent Office—Jun. 6, 2003.

International Preliminary Examination Report—PCT/US01/050892—IPEA/US—Apr. 30, 2003.

Internation Preliminary Examination Report—PCT/US01/050895—IPEA/US—Sep. 2, 2003.

Acampora, "The Use of Resource Sharing and Coding to Increase the Capacity of Digital Satellites," IEEE Journal on Selected Areas in Communications, vol. SAC-1 No. 1, Jan. 1983.

Acampora, "A Wireless Network for Wide-Band Indoor Communcations," IEEE Journal on Selection Areas in Communications, vol. SAC-5, Jun. 1987.

Buchholz et al., "Real-Time Management of Radio Turnaround in a TDMA/TDD System" MO-LA Technical Developments vol. 22 Jun. 1994.

Fifer, et al., "The Low-Cost Packet Radio," Proceedings of the IEEE, vol. 75, No. 1 Jan. 1987.

(56) References Cited

OTHER PUBLICATIONS

Filip, et al., "Adaptive Modulation as a Fade Countermeasure. An Olympus Experiment," International Journal of Satellite Communications, vol. 8, 31-41 (1990).
Fischer et al., "Wide-Band Packet Radio Technology", IEEE Transactions on Communications, vol. 75, No. 1, Jan. 1987.
Forney, et al., "Efficient Modulation for Band-Limited Channels", IEEE Journal on Selected Areas in Communications, vol. sac-2, No. 5, Sep. 1984.
Goodman, "Embedded DPCM for variable bit rate transmission", IEEE Transactions on Communications, vol. com-28, No. 7, Jul. 1980.
Heegard, et al., "A Microprocessor-Based PSK Modem for Packet Transmission Over Satellite Channels", IEEE Transactions on Communications, vol. com-26, No. 5, May 1978.
Henry, et al., "HF Radio Data Communication: CW to Clover", Communications Quarterly, Spring 1992, pp. 11-24.
Jacobsmeyer, "Adaptive Trellis Coded Modulation for Bandlimited Meteor Burst Channels", IEEE Journal on Selecte Areas in Communications, vol. 10, No. 3, Apr. 1992.
Jentz, "Method to conserve power in subscribers using C/I+N algorithm", Motorola Technical Developments, vol. 21, Feb. 1994.
Khan, et al., "Adaptive Forward Error Control for Digital Satellite Systems," IEEE Transactions of Aerospace and Electronics Systems, vol. AES-21, No. 4, Jul. 1985.
Knisely et al., "CDMA2000: A Third_Generation Radio Transmission Technology", Bell Labs Technical Journal, Bell Laboratories, US, vol. 3, No. 3, Jul. 1, 1988.
Lin, et al., "An Adaptive ARQ Scheme Using Pragmatic TCM", Singapore ICCS 1994 Conference Proceedings, vol. 2, Nov. 14-18, pp. 649-652.
Milstein, et al., "Performace of Meteor-Burst Communication Channels", IEEE Journal on Selected Areas in Communicaions, vol. sac-5, No. 2, Feb. 1987.
Murphy, "Telecommunications Talk," Creative Computing, Jan. 1985, vol. 11, No. 1, pp. 16-22.
Oetting, "An Analysis of Meteor Burst Communications for Military Applications", IEEE Transactions on Communications, vol. com-28, No. 9, Sep. 1980.
Petit, "CLOVER II: A Technical Overview, AARL Amateur Radio," San Jose, California, Sep. 27-29, 1991.
Ristenbatt, et al., "Performance Criteria for Spread Spectrum Communications", IEEE Transactions on Communications, vol. com-25, No. 8, pp. 756-763, Aug. 1977.
Rozenstrauch et al., "Control Channel Interference Detection INS TDMA Systems with Frequency Re-Use", Motorola, Inc, Technical Developments, Nov. 1995.
Thomas, et al., "A New Generation of Digital Microwave Radios for U.S. Military Telephone Networks," IEEE Transactions on Communications, vol. COM-27, No. 12, Dec. 1979.
Thompson et al., "Analysis of diversity reception improvements in spread spectrum receivers", Proceedings of the IEEE 3rd International Symposium on Spread Spectrum Techniques and Applications, vol. 2, pp. 455-459, Jul. 4-6, 1994, Oulu, Finland.
Tyson, Tom: "A Method for Improved Site Selection in a Cell-Based TDMA Fail-Soft System" Motorola Technical Developments; Dec 1, 1997, pp. 194-195.
Vos, "Minimum Distance Channel Quality Metric", Motorola, Inc., Technical Developments, vol. 20, Oct. 1993, pp. 8-9.
Webb, "QAM: The Modulation Scheme for Future Mobile Radio Communications," Electronics & Communication Engineering Journal, Aug. 1992, pp. 167-176.
Weitzen, et al., "A High Speed Digital Modem for the Meteor Channel", Proceedings of the Seventeenth Annual Conference on Information Science and Systems, Mar. 23-25, 1983.
Weitzen, "Feasibility of high speed digital communications on the meteor scatter channel", University of Wisconsin, 1983.
Zhang, et al.: "An Integrated Voice/Data System for mobile indoor Radio Networks Using Multiple Transmission Rate", Global Telecommunications Conference. IEEE, Nov. 27-30, 1989, Dallas, TX, vol. 3, pp. 1366-1370.
ITU-T V. 32, "Data communication over the telephone network: A family of 2-wire, duplex modems operating at data signalling rates of up to 9600 bit/s for us eon the general switched telephone network and on leased telephone type circuits", V. 32 Mar. 1993.
Jacobsmeyer, "Adaptive Trellis Coded Modulation for Bandlimited Meteor Burst Channels", 1989 IEEE Military Communications Conference (MILCOM '89), vol. 2, pp. 418-422 (Cat. No. 89CH2681-5).
Kinsely, D.N., et al. CDMA 2000: "A Third-Generation Radio Transmission Technology," Bell Labs Technical Journal, Bell Laboratories, US. vol. 3, No. 3, Jul. 1, 1998, pp. 63-78.
Shinsuke Hara & Ramjee Prasad, Overview of Multicarrier CDMA, IEEE Comm. Mag., Dec. 1997, at 126.
U.S. Appl. No. 08/963,386, entitled "Method and Apparatus for High Rate Packet Data Transmission," filed Nov. 3, 1997. Paul E. Bender, et al., QUALCOMM Inc., San Diego, California (USA).
U.S. Appl. No. 09/575,073, entitled "High Data Rate Wireless Packet Data Communications System," filed May 19, 2000. Paul E. Bender, et al., QUALCOMM Inc., San Diego, California (USA).
Bi Q et al.: "The performance of DS-CDMA for wireless local loop" spread spectrum techniques and applications proceedings, 1996. IEEE 4th International Symposium on Mainz, Germany Sep. 22-25, 1996, New York, NY, USA, IEEE, US, vol. 3, Sep. 22, 1996, pp. 1330-1333.
Chuang J C-I et al.: "Uplink Power Control for TDMA Portable Radio Channels" Proceedings Of the International Conference on Communications (ICC). Geneva, May 23-26, 1993, New York, IEEE, US, vol. 3, May 23, 1993, pp. 584-588.
Hayes Microcomputer Products, Inc., Smartmodem 1200B Hardware Reference Manual, Norcross, GA, 1986.
European Search Report—EP10179605, Search Authority—Munich Patent Office, Oct. 21, 2010.
European Search Report—EP10179607, Search Authority—Munich Patent Office, Nov. 4, 2010.
European Search Report—EP10179610, Search Authority—Munich Patent Office, Jan. 12, 2011.
Falahati, et al., "Implementation of Adaptive 5400 bit/s Modem Frequency Selective HF Radio Links", Electronic Letters: An International Publication, vol. 28, No. 13, Jun. 18, 1992, pp. 1238-1240.
Fischer et al., "Wide-Band Packet Radio for Multipath Environments", IEEE Transactions on Communications, vol. 36, No. 5, pp. 564-576, May 15, 1988.
Hirade, et al., "Digital Transmission Technology for Mobile Radio Communication," Regular Members (Yokosuga Electrical Communication Laboratory, NTT, Yokosuga-shi), Feb. 1982.
Huang, Chenhong. "An Analysis of CDMA 3G Wireless Communications Standards," 1999 IEEE 49th Vehicular Technology Conference, United States of America, IEEE, Jul. 1999, vol. 1, pp. 342-345.
ITU-T V.22 bis, Data Communication Over the Telephone Network: 2400 Bits Per Second Duplex Modem Using the Frequency Division Technique Standardized for Use on the General Switched Telephone Network and on Point-To-Point 2-Wire Leased Telephone-Type Circuits, 1993.
Petit, "The "CLOVERLEAF" Performance-Oriented HF Data Communication System," 9th Computer Networking Conference, Sep. 22, 1990, pp. 191-202.
Prasad, R. et al., "An Overview of CDMA Evolution Toward Wideband CDMA", IEEE Communications Survey, 1998, pp. 2-29, vol. 1. No. 1.
Salz, et al., "An Experimental Digital Multilevel FM Modem", IEEE Transactions on Communications, vol. com-14, No. 3, Jun. 1966, pp. 259-265.
Steele, "Deploying Personal Communication Network," Proceedings Wireless 91, The Third National Seminar & Workshop on Wireless Personal Communications, Sep. 1990, pp. 2, 12-15, ISSN 0163-6804.
Steele, et al., "Variable Rate QAM for Data Transmission Over Rayleigh Fading Channels," Proceedings Wireless 91, The Third National Seminar & Workshop on Wireless Personal Communications, pp. 1-14, 1991.

(56) References Cited

OTHER PUBLICATIONS

Tiedemann, Ed. "Using a 1X Reverse Link with a 3X Forward Link," 3GPP2 TSG-C Contribution, Aug. 19, 1999, 3GPP2-C30-19990817-038, URL: ftp://ftp.3gpp2.org/TSGC/Working/1999/TSG-C_9908/TSG-C.3/C30-19990817-038%20QCOM%201X_RL.doc.

West, R. L., Abstract, "Data Concentration Method", IBM Technical Disclosure Bulletin, Originally disclosed by IBM on Jul. 1, 1975, pp. 487-489 (3 pages).

Bruhn, S. et al., "Concepts and Solutions for Link Adaption and Inband Signaling for the GSM AMR Speech Coding Standard," IEEE 49th Vehicular Technology Conference, vol. 3, XP002901443, May 16, 1999, pp. 2451-2455, doi: 10.1109/VETEC.1999.778517.

ETSI EN 301 709, V.7.0.2: "Digital cellular telecommunications system (Phase 2+); Link Adaptation (GSM 05.09 version 7.0.2 Release 1998)," (Dec. 1, 1999), pp. 1-13, XP002177164.

European Search Report—EP14167795—Search Authority—Munich—Sep. 19, 2014.

* cited by examiner

US 9,107,109 B2

METHOD AND APPARATUS FOR DETERMINING A DATA RATE IN A HIGH RATE PACKET DATA WIRELESS COMMUNICATIONS SYSTEM

CLAIM OF PRIORITY UNDER 35 U.S.C. §120

The present Application for patent is a Continuation and claims priority to patent application Ser. No. 09/697,372 entitled "Method and Apparatus for Determining a Data Rate in a High Rate Packet Data Wireless Communications System" filed Oct. 25, 2000, now U.S. Patent No. 6,973,098, and assigned to the assignee hereof and hereby expressly incorporated by reference herein.

REFERENCE TO RELATED CO-PENDING APPLICATIONS FOR PATENT

The present invention related to the following U.S. Application for patent:

U.S. Patent Application No. 08/963,386 entitled "METHOD AND APPARATUS FOR HIGH RATE PACKET DATA TRANSMISSION," filed on Nov. 3, 1997, now U.S. Pat. No. 6,574,211, issued Jun. 3, 2003 to Padovani et al., and assigned to the assignee hereof which is hereby expressly incorporated by reference herein;

and to:

U.S. Patent Application No. 09/697,375, filed Oct. 25, 2000, now U.S. Patent No. 7,068,683, entitled METHOD AND APPARATUS FOR HIGH RATE PACKET DATA AND LOW DELAY DATA TRANSMISSIONS, and assigned to the assignee hereof.

FIELD

The present invention relates to wireless data communication. More particularly, the present invention relates to a novel and improved method and apparatus for high speed packet data and low delay data transmissions in a wireless communication system.

BACKGROUND

Increasing demand for wireless data transmission and the expansion of services available via wireless communication technology has led to the development of specific data services. One such service is referred to as High Data Rate (HDR). An exemplary HDR type system is proposed in "TL80-54421-1 HDR Air Interface Specification" referred to as "the HAI specification." HDR generally provides an efficient method of transmitting packets of data in a wireless communication system. A difficulty arises in applications requiring both voice and packet data services. Voice systems are considered low delay data systems, as the voice communications are interactive and therefore processed in real-time. Other low delay data systems include video, multi-media, and other real-time data systems. HDR systems are not designed for voice communications but rather are designed to optimize data transmissions, as the base station in an HDR system circulates through the various mobile users, sending data to only one mobile user at a time. The circulation introduces delay into the transmission process. Such delay is tolerable for data transmission, as the information is not used in real-time. In contrast, the circulation delay is not acceptable for voice communications.

There is a need for a combination system for transmitting high speed packet data information along with low delay data, such as voice information. There is a further need for a method of determining the data rate for high packet data rate information in such a combination system.

SUMMARY

The disclosed embodiments provide a novel and improved method for high packet data rate and low delay data transmission in a wireless communication system. In one embodiment, a base station in a wireless communication system first sets up low delay data transmission, effectively as high priority, and then schedules packet data services according to the available traffic power after satisfying the low delay data. The packet data service transmits the packet data to one mobile user at a time. Alternate embodiments may provide packet data to multiple mobile users at a time, dividing the available power among the multiple users. At a given time, one user is selected as a target recipient based on the quality of the channel. The base station determines a ratio of the available power to the pilot channel power and provides the ratio to the selected mobile user. The ratio is referred to as the "Traffic-to-Pilot" ratio, or "T/P" ratio. The mobile user uses the ratio to calculate a data rate and sends that information back to the base station.

In one embodiment, the base station provides a "Broadcast-to-Pilot" ratio, or "B/P" ratio to the mobile user, wherein the ratio considers the broadcast power, i.e., the total available transmission power, of the base station and the pilot power, i.e., the power portion of the broadcast power used for the pilot channel. The mobile user determines a normalized data rate to request from the base station, wherein the normalized data rate is a function of the B/P. The normalized data rate is sent to the base station and a decision made as to the appropriate data rate. The data rate selection is then sent to the mobile user.

In an exemplary embodiment, a parallel signaling channel is used to provide the T/P ratio information to the mobile user. The parallel signaling channel may be implemented using a separate carrier frequency, or by any of a variety of methods for generating a separate channel.

According to another embodiment, the T/P ratio is provided via the packet data traffic channel, wherein the T/P ratio is included in the header of a packet of data, or is provided continuously along with the packet data.

Alternate embodiments may implement another metric for estimating a SNR of the traffic channel based on the SNR of the pilot channel, wherein the metric is provided to the mobile user for determination of a data rate. The mobile user requests transmissions at or below the determined data rate.

In one aspect a wireless communication apparatus includes a first processor operative to receive a first indicator, the first indicator corresponding to available packet data transmission power; and a correlation unit operative to determine a packet data transmission rate indicator as a function of the first indicator and a received pilot signal strength.

In another aspect, in a wireless communication system, the system operative for transmitting packet data and low delay data, the system having a total available transmit power, a method includes establishing at least one low delay communication link using a first power; determining available packet data traffic power as a function of the total available transmit power and the first power; determining a packet data rate based on the available packet data traffic power.

In still another aspect, a wireless communication apparatus includes a first processor operative to receive a first indicator, the first indicator corresponding to a ratio of available traffic-to-pilot signal strength; a measurement unit operative to receive a pilot signal and determine a pilot signal-to-noise ratio of a pilot signal; a summation node coupled to the measurement unit and the first processor, the summation node operative to adjust the signal-to-noise ratio by the first indicator to form a traffic signal-to-noise ratio; and a correlation unit operative to receive the traffic signal-to-noise ratio and determine an associated data rate for transmission.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
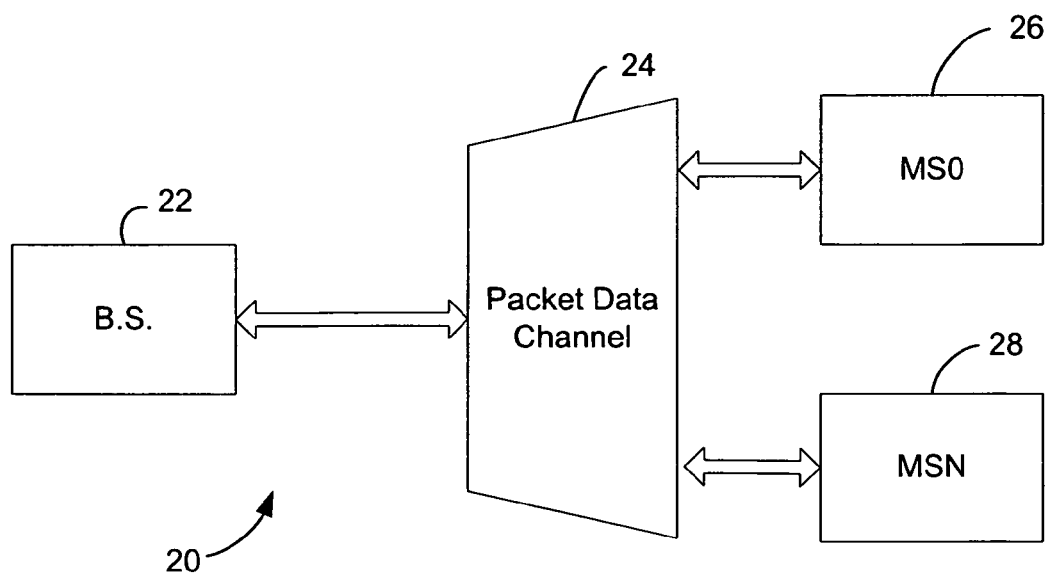
FIG. 1 illustrates in block diagram form one embodiment of a High Data Rate (HDR) protocol wireless communication system.

While it is desirable to implement high rate packet data services and low delay, voice type services in one system, this is a difficult task due to the significant differences between voice services and data services. Specifically, voice services have stringent and predetermined delay requirements. Typically, the overall one-way delay of speech frames must be less than 100 msec. In contrast to voice, the data delay can become a variable parameter used to optimize the efficiency of the data communication system. As the condition of a channel to a given user will vary over time, and it is therefore possible to select the better times to transmit packets based on the channel condition.

Another difference between voice and data services involves the requirement of voice services for a fixed and common grade of service (GOS) for all users. For example, in a digital system the GOS requires a fixed and equal transmission rate for all users having no delay greater than a maximum tolerable value for the frame error rate (FER) of the speech frames. In contrast, for data services, the GOS is not fixed, but rather may vary from user to user. For data services, the GOS may be a parameter optimized to increase the overall efficiency of the data communication system. The GOS of a data communication system is typically defined as the total delay incurred in the transfer of a predetermined amount of data hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

In contrast to voice and other low delay data communications, high data rate data communications typically use packet switched techniques rather than circuit switched techniques for transmission. The data is grouped into small batches to which control information is appended as header and/or tail. The combination of data and control information forms a packet. As packets are transmitted through a system various delays are introduced, and may even include loss of one or multiple packets and/or one or more portions of a packet. HDR and other packet data systems typically tolerate time varying delayed packets as well as lost packets. It is possible to exploit the delay tolerance of packet data systems by scheduling transmissions for optimum channel conditions. In one embodiment, the transmissions to multiple users are scheduled according to the quality of each of transmission link. The transmission uses all available power to transmit data to one of the multiple users at a time. This introduces a variable delay, as the multiple users may not have a priori knowledge of the target recipient, the scheduling of transmissions, the data rate, and/or the configuration information, including the modulation technique, the channel encoding, etc. In one embodiment, rather than have each receiver estimate such information, the receiver requests a data rate and corresponding configuration. The scheduling is determined by a scheduling algorithm and sent in a synchronization message.

Prior to requesting the data rate, the receiver determines an optimum data rate, wherein the data rate may be based on available transmission power. The data rate is proportional to the transmission power and the quality of the channel. As used herein, a combination system is a system capable of handling both low delay data transmissions and packet data transmission. In a combination system capable of handling voice and packet data transmissions, the available power, and thus the available data rate, varies with time with the voice activity. The receiver does not have knowledge of the voice activity of the system in determining a data rate. One example of a combination system is a Wideband Code Division Multiple Access, such as the "ANSI J-STD-01 Draft Standard for W-CDMA (Wideband Code Division Multiple Access) Air Interface Compatibility Standard for 1.85 to 1.99 GHz PCS Applications" referred to as "W-CDMA."Other systems include the "TIA/ELIAS-2000 Standards for cdma200 Spread Spectrum Systems" referred to as "the cdma2000 standard," or other per-user connection systems.

A packet data system 20 is illustrated in FIG. 1 consistent with the protocols defined by the HAI specification. In the system 20, a base station 22 communicates with mobile stations 26 through 28. Each mobile station 26-28 is identified by an index value from 0 to N, N being the total number of mobile stations within the system 20. The packet data channel 24 is illustrated as a multiplexor to illustrate the switchable connection. The base station 22 may be referred to as an "access terminal device" for providing connectivity to users (i.e., mobile station or access terminal), specifically, one user at a time. Note that an access terminal is typically connected to a computing device, such as a laptop computer, or a personal digital assistant. An access terminal may even be a cellular telephone with web access capabilities. Similarly, the packet data channel 24 may be referred to as an "access network" for providing data connectivity between a packet switched data network and the access terminal device. In one example, the base station 22 connects mobile stations 26-28 to the Internet.

In a typical HDR system, packet data communications proceed with one link to the selected recipient, wherein packet data channel 24 schedules the various mobile stations 26-28 one at a time. Forward traffic channel refers to data transmitted from the base station, and reverse traffic channel refers to data transmitted from the mobile stations 26-28. The packet data system 20 schedules users by implementing one link to one user at a given time. This is in contrast to low delay data transmission systems where multiple links are maintained concurrently. The use of a single link allows a higher transmission data rate for the selected link and optimizes transmissions by optimizing the channel condition for at least one link. Ideally the base station only uses a channel when it is at an optimum condition.

The user(s) of mobile stations 26-28 that expect data service(s) provide a forward traffic channel data rate via a Data Rate Control (DRC) channel to the base station 22. The users are scheduled according to the quality of signal received, wherein scheduling also ensures that users are scheduled according to a fairness criteria. For example, a fairness criterion prevents the system from favoring those mobile users proximate to the base station over others that are distant. The requested data rate is based on the quality of signals received at the scheduled user. The ratio of the Carrier-to-Interference (C/I) is measured and used to determine a data rate for the communication.

Figure 2:
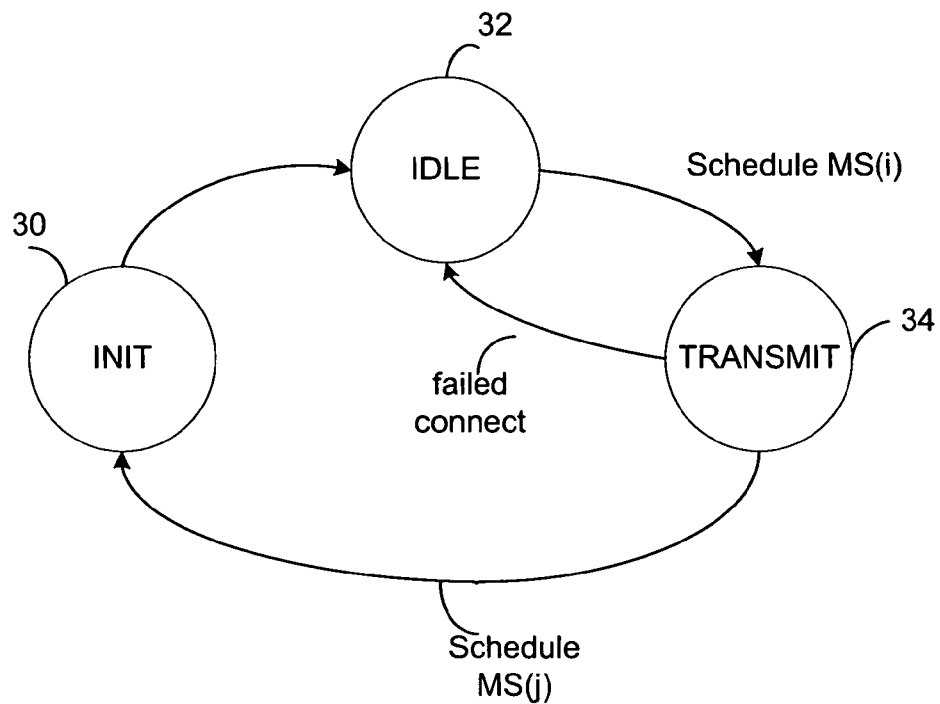
FIG. 2 illustrates a state diagram describing operation of an HDR system as in FIG. 1.

FIG. 2 illustrates a state diagram describing operation of the system 20 of FIG. 1, such as an HDR system operation consistent with the HAI specification. The state diagram describes operation with one mobile user, MSi. At state 30, labeled "INIT," base station 22 acquires access to packet data channel 24. During this state initialization includes acquiring a forward pilot channel and synchronizing control. Upon completion of the initialization, operation moves to state 32, labeled "IDLE." In the idle state the connection to a user is closed and the packet data channel 24 awaits further command to open the connection. When a mobile station, such as MSi, is scheduled, the operation moves to state 34, labeled "TRANSMIT." At state 34, the transmission proceeds with MSi, wherein MSi uses the reverse traffic channel, and the base station 22 uses the forward traffic channel. If the transmission or connection fails or the transmission is terminated, operation returns to IDLE state 32. A transmission may terminate if another user of mobile stations 26-28 is scheduled. If a new user outside of mobile stations 26-28 is scheduled, such as MSj, operation returns to INIT state 30 to establish that connection. In this way, the system 20 is able to schedule users 26-28 and also users connected through an alternate access network.

Figure 3:
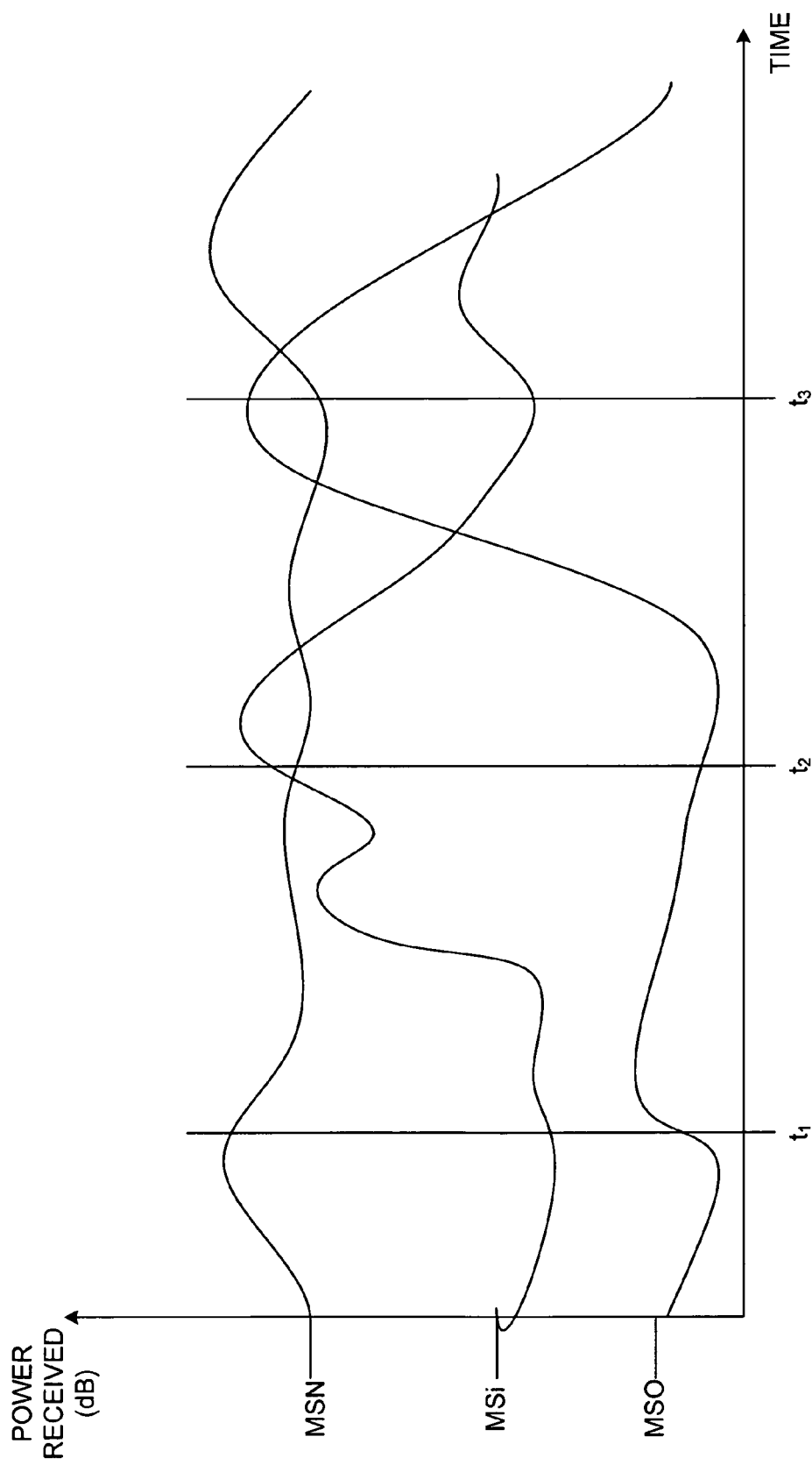
FIG. 3 illustrates in graphical form usage patterns for multiple packet data users within an HDR wireless communication system as in FIG. 1.

Scheduling users allows the system 20 to optimize service to mobile stations 26-28 by providing multi-user diversity. An example of the usage patterns associated with three (3) mobile stations MS0, MSi, and MSN within mobile stations 26-28 is illustrated in FIG. 3. The power received in dB at each user is graphed as a function of time. At time $t_1$ MSN receives a strong signal, while MS0 and MSi are not as strong. At time $t_2$ MSi receives the strongest signal, and at time $t_3$ MS0 receives the strongest signal. Therefore, the system 20 is able to schedule communications with MSN around time $t_1$, with MSi around time $t_2$, and with MS0 around time $t_3$. The base station 22 determines the scheduling at least in part based on the DRC received from each mobile station 26-28.

Figure 4:
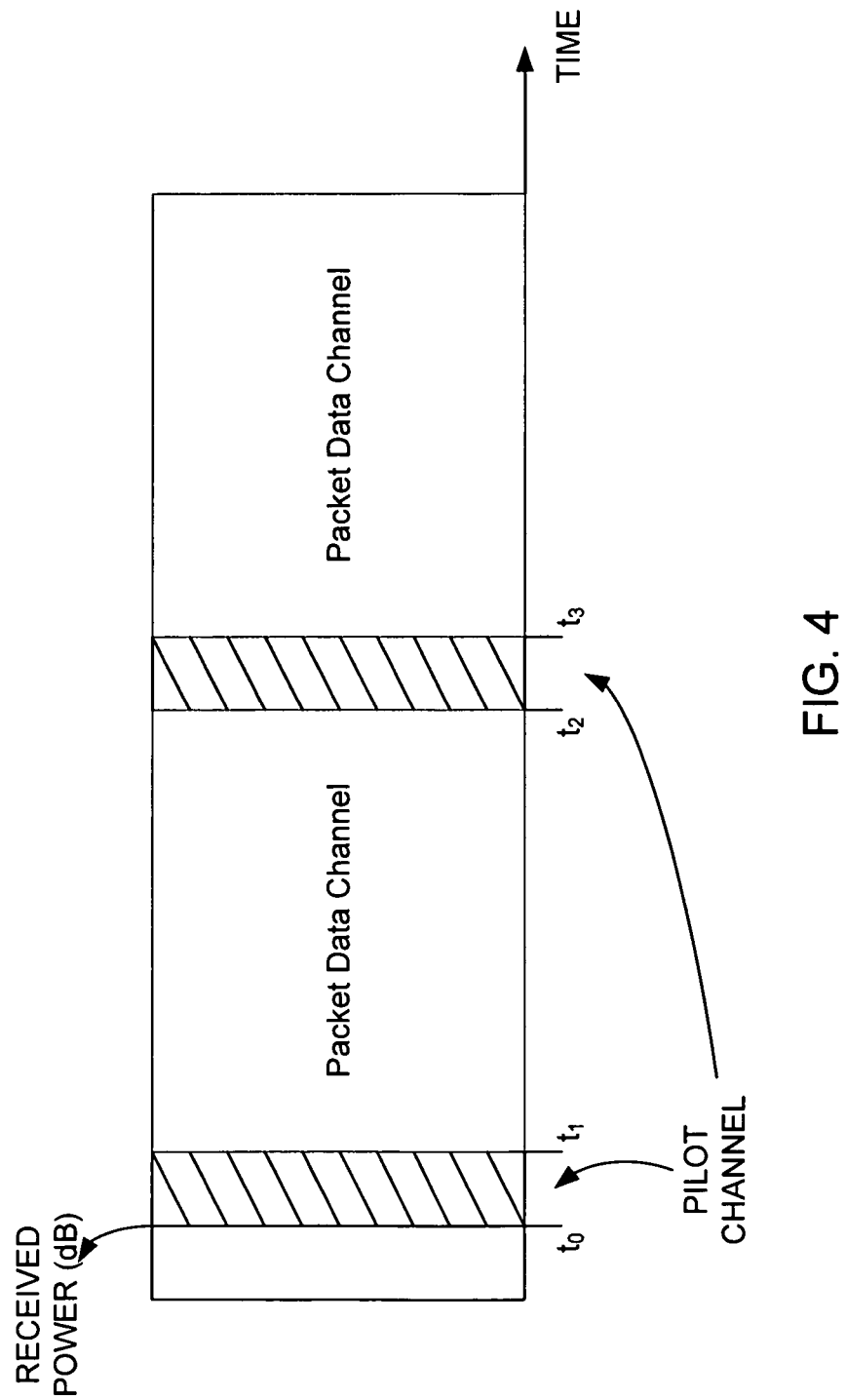
FIG. 4 illustrates in graphical form power received by a user within an HDR wireless communication system as in FIG. 1.

An exemplary HDR transmission within system 20 is illustrated in FIG. 4. Pilot channel transmissions are interspersed with the packet data channel. For example, the pilot channel uses all available power from time $t_0$ to $t_1$, and similarly from time $t_2$ to $t_3$. The packet data channel uses all available power from time $t_1$ to $t_2$, and from time $t_3$, etc. Each mobile station 26-28 calculates a data rate based on the total available power as used by the pilot channel. The data rate is proportional to the available power. When the packet data system 20 only transmits packetized data to mobile stations 26-28, the pilot channel accurately reflects the calculation of available power. However, when voice and other low delay data services are coupled within one wireless communication system, the calculation becomes more complex.

Figure 5:
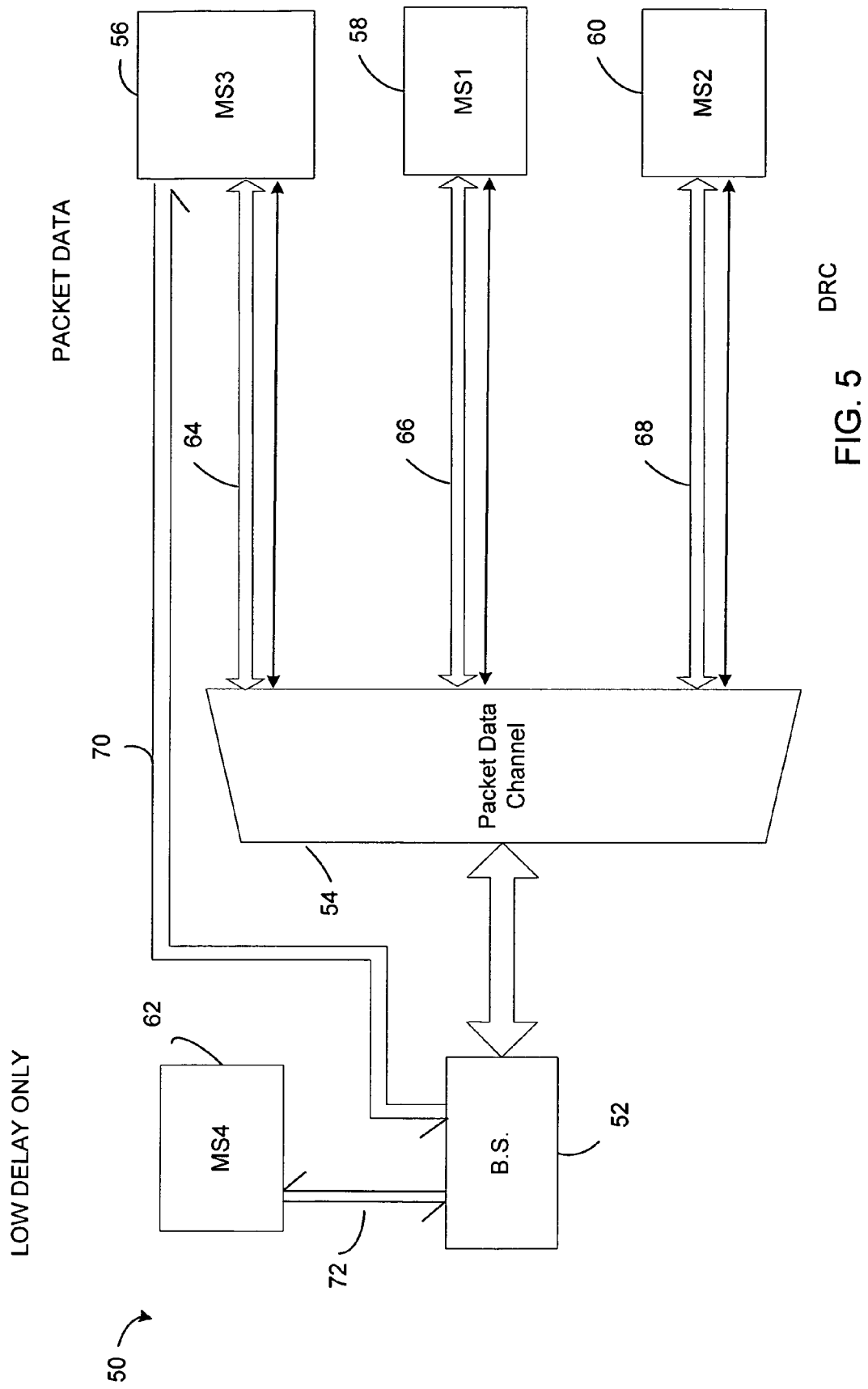
FIG. 5 illustrates in block diagram form an HDR wireless communication system including low delay data users according to one embodiment.

FIG. 5 illustrates a CDMA wireless communication system 50 according to one embodiment. The base station 52 communicates with multiple mobile users that may employ services including, but not limited to, low delay data-only services, such as voice services, low delay data and packet data services, and/or packet data-only services. The system implements a cdma2000 compatible protocol for transmitting packetized data services, which operates concurrently with a low delay data service. At a given time, the mobile stations 58 and 60 (MS1 and MS2) use only packet data services, the mobile station 56 (MS3) uses a packet data service and a low delay data service, and the mobile station 62 (MS4) uses only a voice service. The base station 52 maintains a communication link with MS4 62 via forward and reverse channels 72, and with MS3 56 via forward and reverse channels 70. For the HDR communications, the base station 52 schedules users for data communication via packet data channel 54. HDR communication with MS3 56 is illustrated through channel 64, with MS1 58 through channel 66, and with MS2 60 through channel 68. Each of the packet data service users provides data rate information to the base station 52 on respective DRCs. In one embodiment, the system 50 schedules one packetized data link during a given time period. In alternate embodiments, multiple links may be scheduled concurrently, wherein each of the multiple links uses only a portion of the available power.

Figure 6:
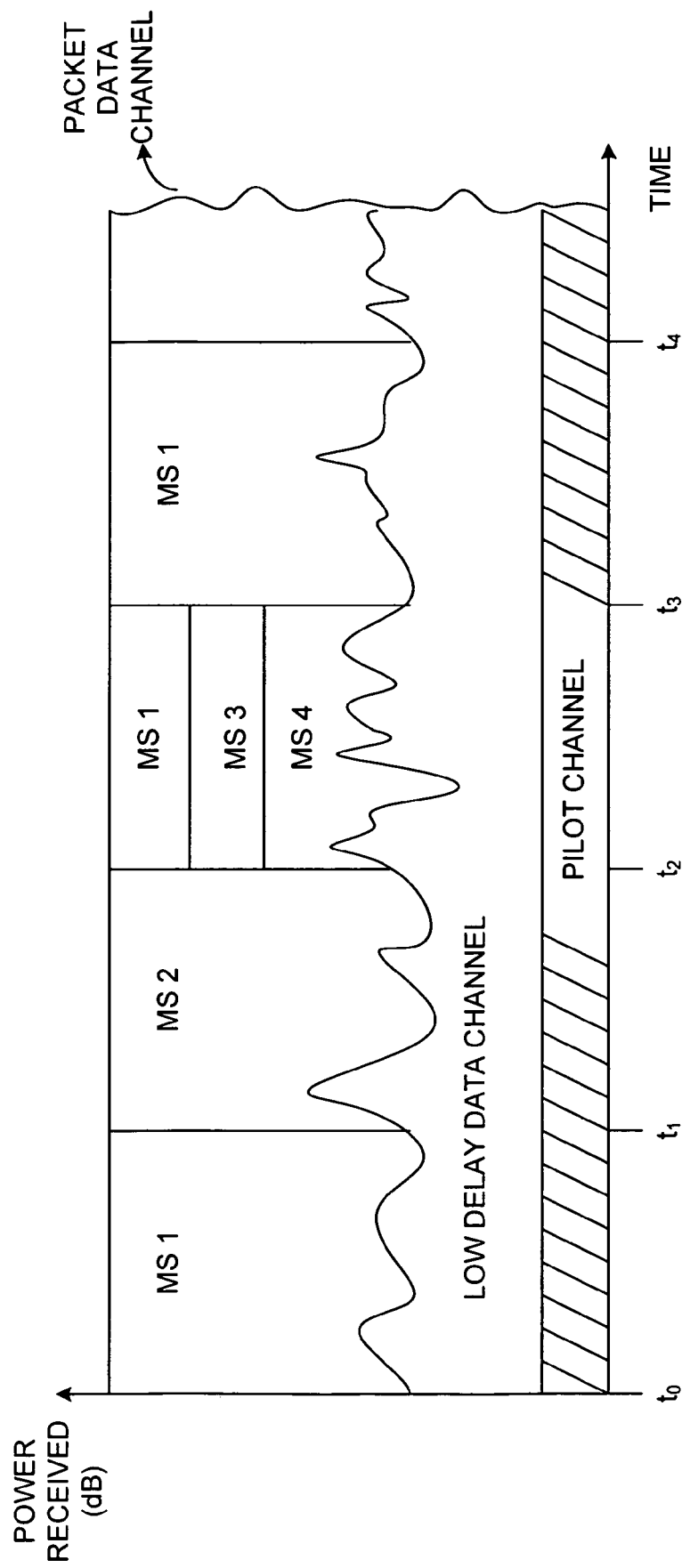
FIG. 6-8 illustrate in graphical form power received by users in HDR wireless communication systems according to various embodiments.

Operation of the system 50 according to one embodiment is illustrated graphically in FIG. 6. The pilot channel is provided continuously, as is typical of low delay data systems. The power used by the low delay data channel varies continuously over time as transmissions are initiated, processed and terminated, and according to the specifics of the communications. The packet data channel uses the available power after the pilot channel and low delay data services are satisfied. The packet data channel is also referred to as a Pooled Supplemental Channel (PSCH), including resources of the system available after dedicated and common channels are allocated. As illustrated in FIG. 6, dynamic resource allocation involves pooling all unused power and spectrum spreading codes, such as Walsh codes, to form the PSCH. A maximum broadcast power is available with respect to the PSCH, which may be referred to as $I_{or}$max.

According to one embodiment, the PSCH channel format defines parallel sub-channels, each having a unique spectrum spreading code. One frame of data is then encoded, interleaved and modulated. The resultant signal is demultiplexed over the subchannels. At the receiver, the signals are summed together to rebuild a frame. A variable frame length-encoding scheme provides for longer frames at lower frame rates per slot. Each encoded packet is sliced into sub-packets, wherein each sub-packet is transmitted via one or multiple slots, providing incremental redundancy.

In contrast to FIG. 4, the addition of low delay data with the HDR transmissions introduces a variable floor for measuring the available power. Specifically, in a packet data-only system as illustrated in FIG. 4, all of the spread spectrum codes, such as Walsh codes, are available for use on the selected transmission link. When voice or low delay data services are added to the packet data services, the number of available codes becomes variable, changing with time. As the number of voice or low delay data services changes, the number of codes available for transmitting the data changes.

As illustrated in FIG. 6, MS1 is scheduled during the time period from $t_0$ to $t_1$, and MS2 from $t_1$, to $t_2$. During the time period from $t_2$ to $t_3$, multiple packetized data links are connected, including MS1, MS3 and MS4. During the time period form $t_3$ to $t_4$, MS1 is again scheduled alone. As illustrated, throughout the time periods $t_0$ to $t_4$, the power consumed by the low delay data channel varies continuously, impacting the power available for packetized data communications. As each mobile station calculates a data rate prior to receiving transmissions, a problem may occur during a transmission if the available power is reduced without a corresponding change in the data rate. To provide the mobile station(s) 56-60 with current information relating to the available power, the base station 52 determines a ratio of the available power to the pilot channel power. The ratio is referred to herein as the "traffic-to-pilot ratio", or "T/P ratio." The base station 52 provides this ratio to the scheduled mobile station(s) 56-60. The mobile station(s) 56-60 use the T/P ratio in conjunction with the SNR of the pilot channel, herein referred to as the "pilot SNR," to determine a data rate. In one embodiment the pilot SNR is adjusted based on the T/P ratio to calculate a "traffic SNR," wherein the traffic SNR is correlated to a data rate. The mobile station(s) 56-60 then transmit the data rate back to the base station 52 as a DRC data rate request.

Figure 7:
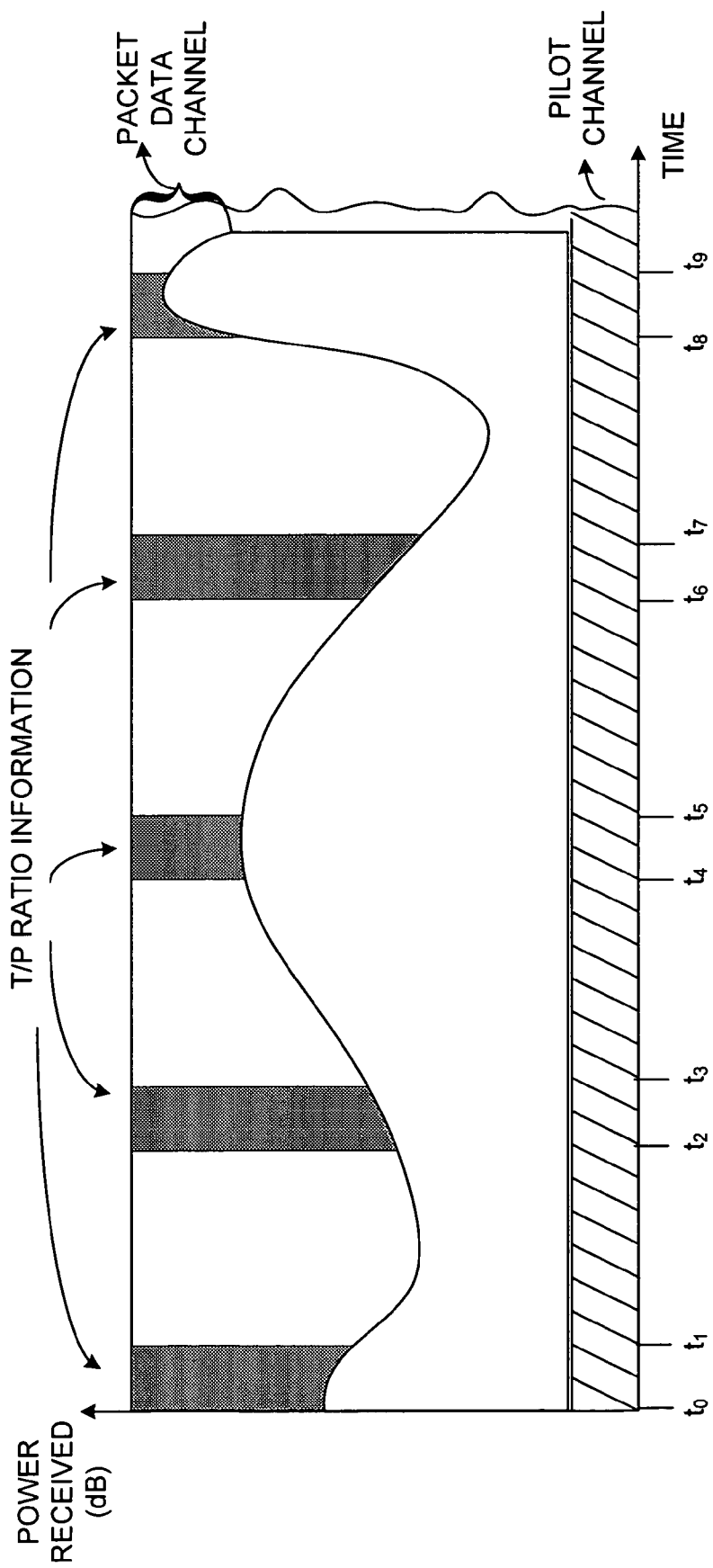

In one embodiment, the T/P ratio is included in the header of a packet of data or may be punctured or inserted into the high rate packet data channel between packetized data traffic. As illustrated in FIG. 7, the T/P ratio information is transmitted prior to traffic and provides the mobile station(s) 56-60 updated information regarding the available power as a result of changes in the low delay data channel. Such changes also impact the number of codes, such as Walsh codes, available for spreading the information signals. Less power available and fewer codes available results in a decreased data rate. For example, in one embodiment, the packetized data to a given user, or to all users if multiple packetized data links are available, is transmitted over channels corresponding to Walsh codes 16-19 in a CDMA system.

Figure 8:
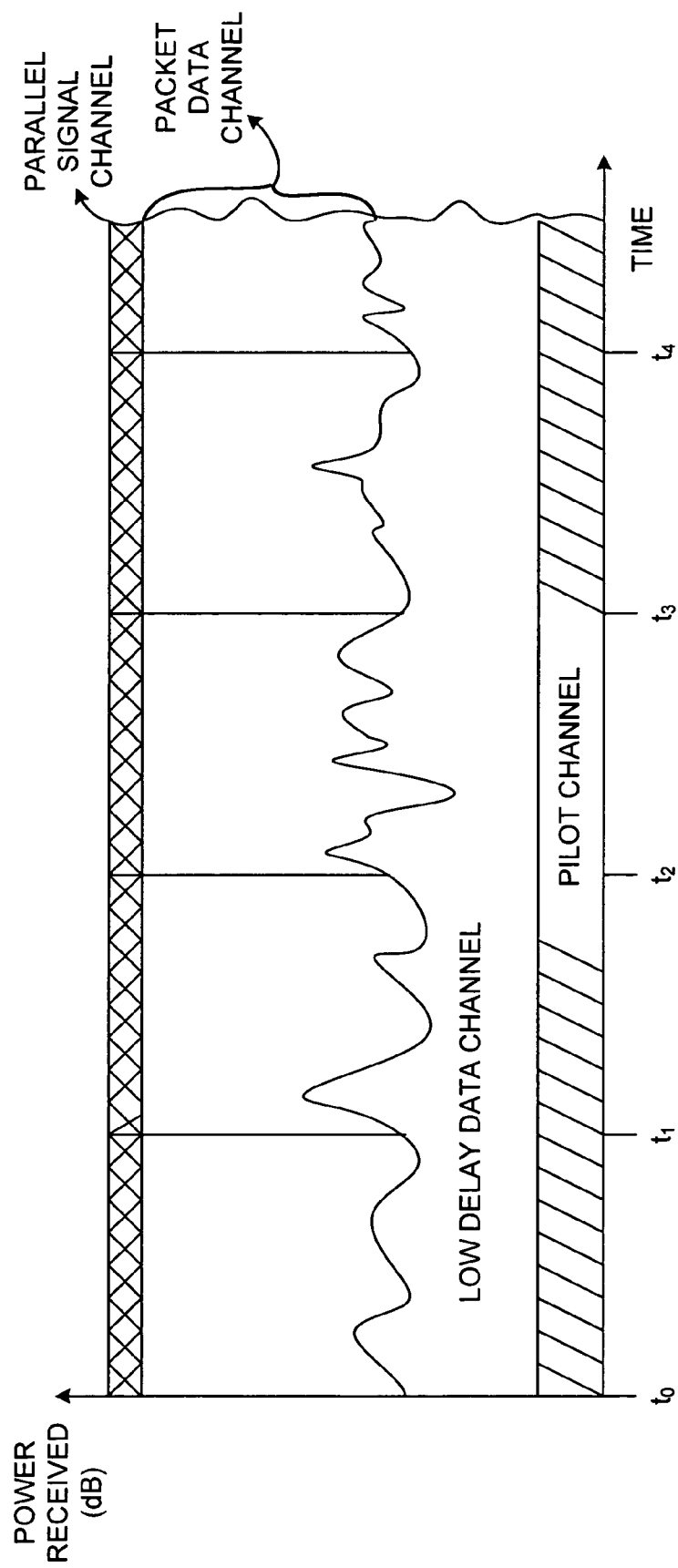

In an exemplary embodiment illustrated in FIG. 8, a parallel signaling channel is used to provide the T/P ratio information to the mobile user. The parallel signaling channel is a low rate channel carried by a separate Walsh code. The parallel signaling channel transmits the target recipient, the channels used for the traffic, as well as the type of coding used. The parallel signaling channel may be implemented using a separate carrier frequency, or by any of a variety of methods for generating a separate channel.

Note that the packet data to a particular user is transmitted on one or multiple pre-selected channels. For example, in one embodiment of a CDMA wireless communication system, Walsh codes 16 to 19 are assigned to data communications. In the exemplary embodiment illustrated in FIG. 8, a signaling message is transmitted on a separate channel having a low transmission rate. The signaling message may be sent concurrently with the data packet. The signaling message indicates the target recipient of the data packet, the transmission channels of the data packet, and well as the coding used. The signaling message may use a separate Walsh code or may be time multiplexed into the high rate data by puncture or insertion.

In one embodiment, the signaling message is encoded into a shorter frame than the frame of the data packet, such as the header, allowing the receiver to decode the signaling message and make processing decision(s) accordingly. The data received that is potentially targeted for the receiver is buffered awaiting the processing decision(s). For example, if the receiver is not the target recipient of the data, the receiver may discard the buffered data or may discontinue any preprocessing of data, such as buffering, etc. If the signaling channel contains no data for the receiver, the receiver discards the buffer, else, the receiver decodes the buffered data using the parameters indicated in the signaling message, reducing any latency of the system.

In one embodiment, the parallel signaling channel is transmitted to multiple users. As multiple users are able to distinguish between data to the various users, each of the multiple users is also able to receive a common packet(s) of data. In this way, the configuration information is provided via the signaling message and each user is able to retrieve and decode the packet(s). In one embodiment, a message is broadcast to multiple users, wherein a group identifier is also broadcast. Mobile users belonging to the group know the group identifier a priori. The group identifier may be placed in the header information. The group identifier may be a unique Walsh code or other means of identifying the group. In one embodiment, mobile user(s) may belong to more than one group.

Figure 9:
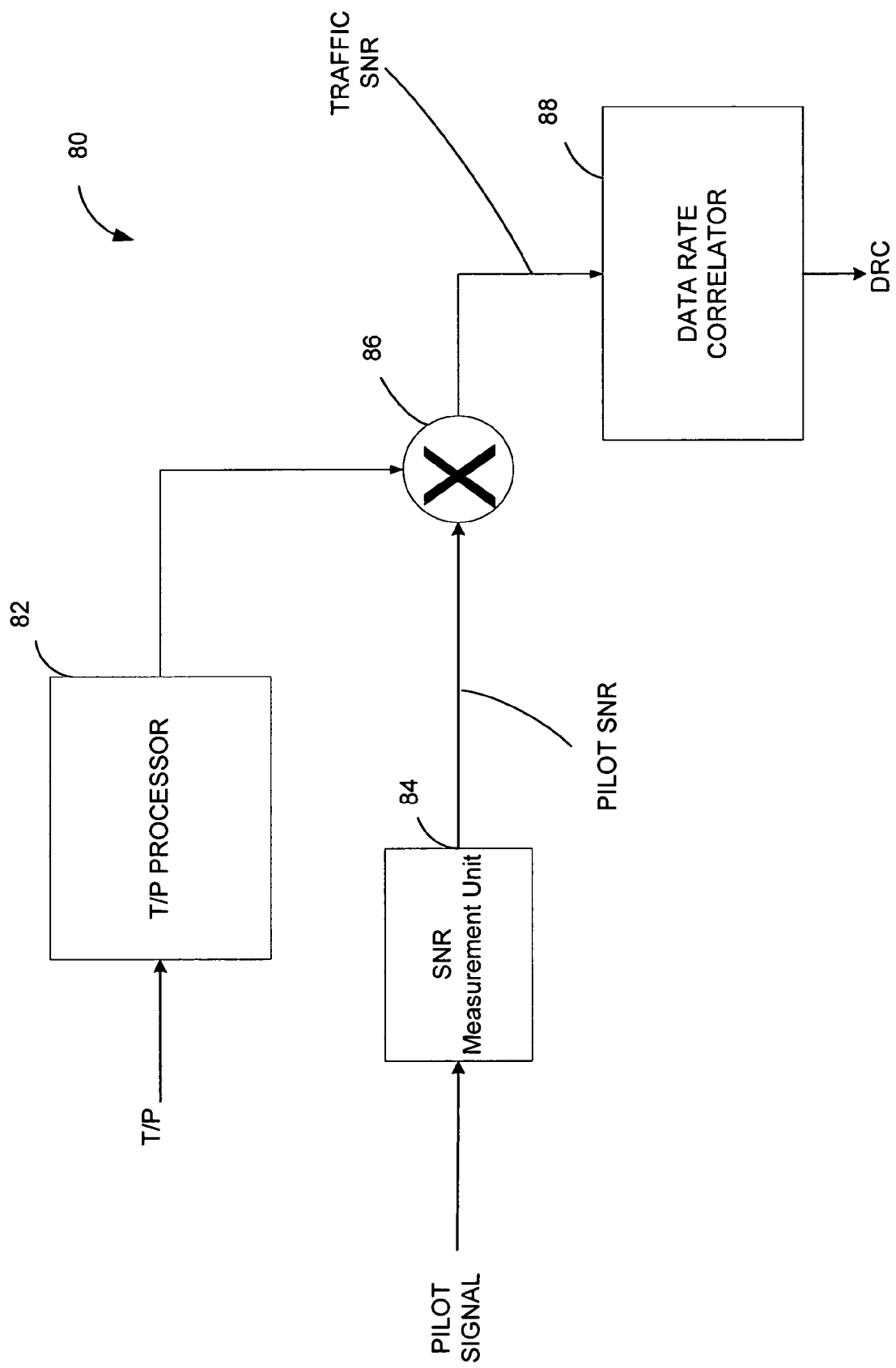
FIG. 9 illustrates in block diagram from a portion of a receiver in an HDR wireless communication system according to one embodiment.

FIG. 9 illustrates a portion of a mobile station 80 adapted for packetized data service within system 50. The T/P ratio information is provided to a T/P processor 82. The pilot signal is provided to SNR measurement unit 84 for calculation of the SNR of the received pilot signal. The output of the T/P ratio and the pilot SNR are provided to multiplier 86 to determine traffic SNR. The traffic SNR is then provided to the data rate correlator 88 that performs an adaptive mapping from the traffic SNR to an associated data rate. The data rate correlator 88 then generates the data rate for transmission via the DRC. The functions performed in this portion of the mobile station 80 may be implemented in dedicated hardware, software, firmware, or a combination thereof.

The T/P ratio may be transmitted using the parallel signaling channel as illustrated in FIG. 8. As the receiver will determine the data rate based on the T/P ratio, the signaling message may not include the data rate. The receiver then determines the arrival timing of data based on a transmitted synchronization message. In one embodiment, a separate signaling message is generated for the timing information. The signaling message is transmitted in parallel to the data. In an alternate embodiment, the signaling message(s) is punctured into the data.

Figure 10:
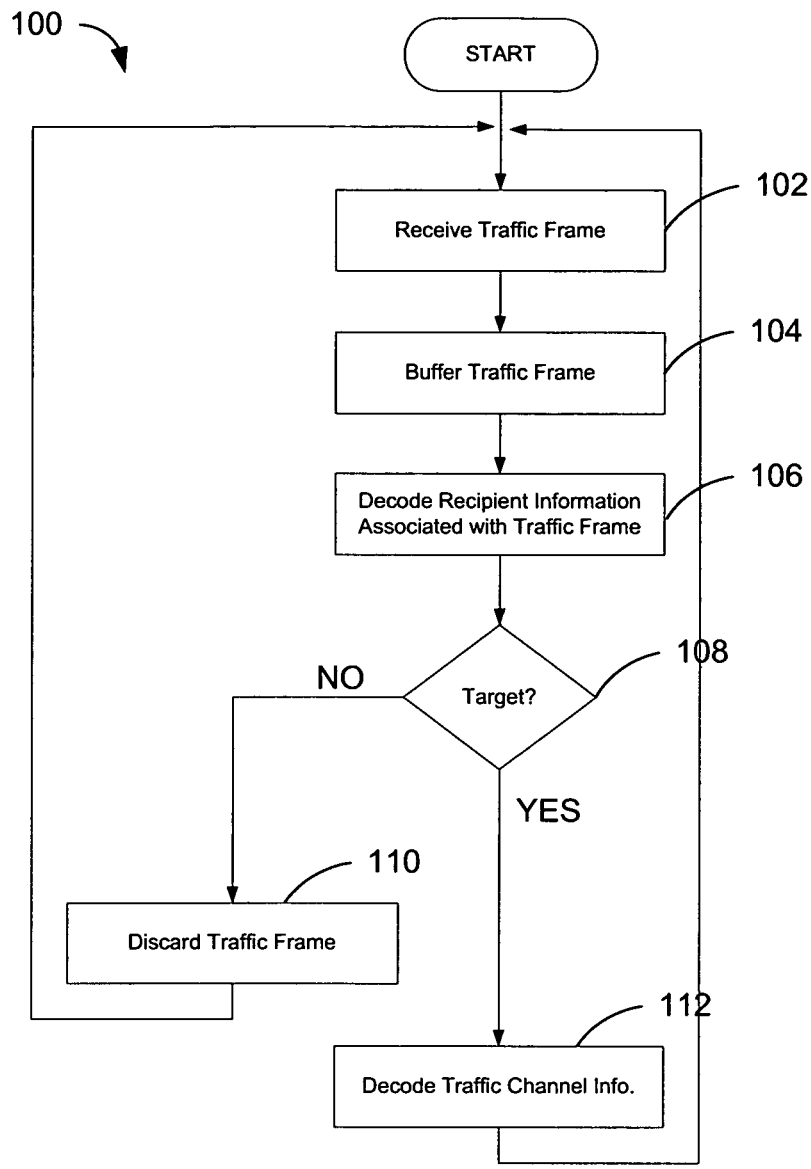
FIG. 10 illustrates in flow diagram for processing traffic data in a wireless communication system implementing a signaling channel according to one embodiment.

FIG. 10 illustrates a method 100 of processing data in a combination wireless communication system capable of packet data and low delay data transmissions according to one embodiment. The mobile station(s) receive a traffic frame, which is information received via the traffic channel, at step 102. The traffic frame is buffered at step 104. Buffering allows the mobile station(s) to handle the information at a later time without losing transmitted data. For example, data received may be buffered while other processing is performed. Or as applied in the present embodiment, the buffering delays processing of data until the mobile station(s) determines the target recipient of the data. Data targeted for other mobile stations are not processed, but rather are ignored saving valuable processing capability. When a mobile station(s) recognizes itself as a target recipient, the buffered data is available for retrieval and processing. The buffered data represents the received radio frequency samples. Alternate embodiments may determine a data rate for transmission without buffering information, wherein the data received is processed without being first stored in a buffer.

Continuing with FIG. 10, the mobile station(s) decode recipient information associated with the traffic frame at step 104. At decision diamond 108 the process determines if a given mobile user matches the target recipient. If there is no match, the process continues to step 110 to discard the buffered traffic frame. Processing then returns to step 102 to receive the next traffic frame. If the mobile user matches the target recipient, then the traffic channel frame is decoded at step 112 and the process returns to step 102. The ability to decode a small portion of the transmission and avoid unnecessary decoding and processing increases the efficiency of operation for a mobile user and reduces the power consumption associated therewith.

Figure 11:
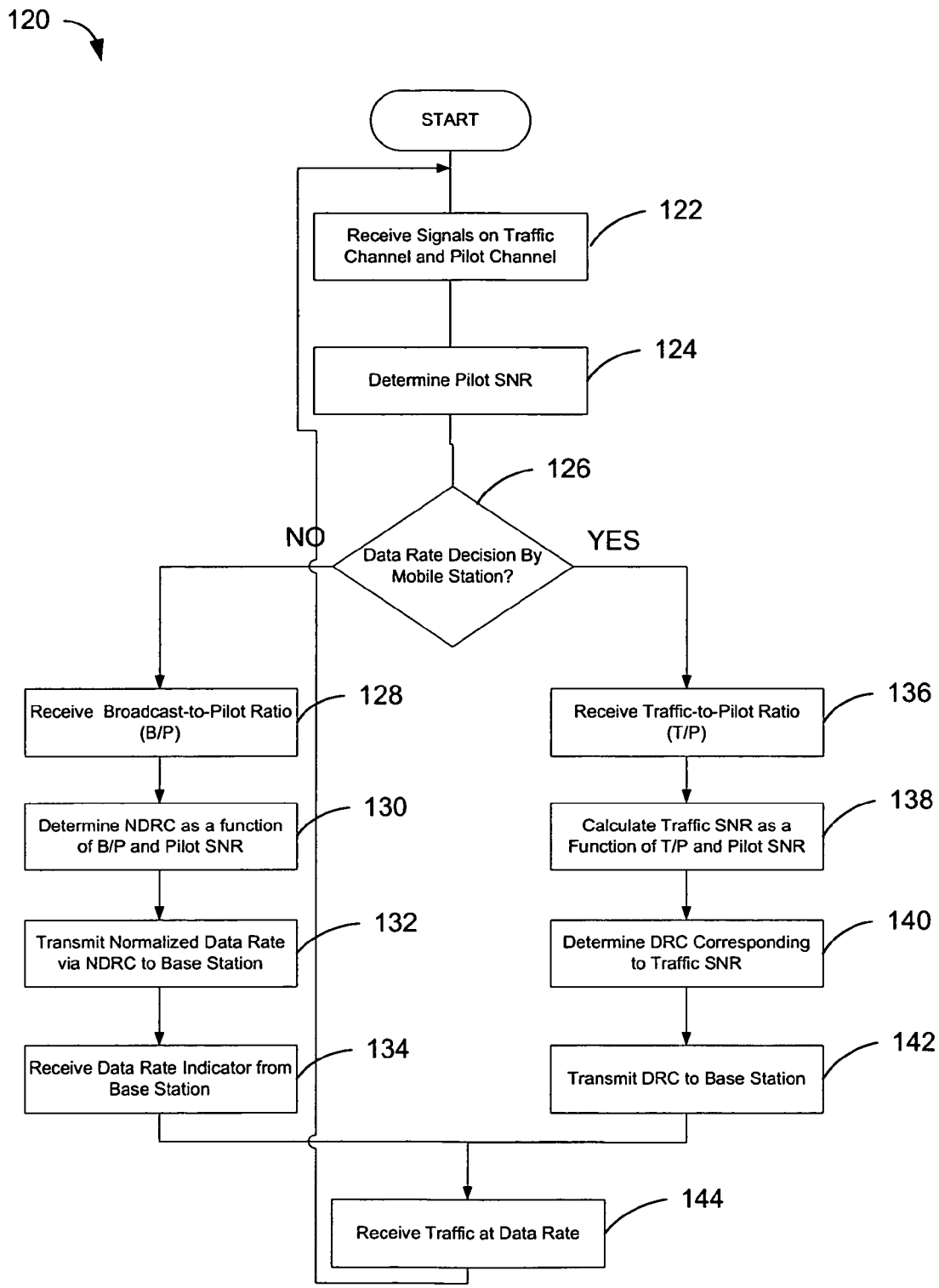
FIG. 11 illustrates in flow diagram for determining a data rate for transmission in a wireless communication system according to one embodiment.

FIG. 11 illustrates various methods of determining a data rate in a combination wireless communication system according to one embodiment. The mobile station(s) receives signals via traffic and pilot channels at step 122. The mobile station(s) determines a "pilot SNR" based on the received pilot signal at step 124. In the present embodiment, the pilot signal is transmitted on a unique channel designated for pilot transmission. In alternate embodiments, the pilot signal may be punctured into one or more other transmissions on one or more other channels. In one embodiment, the pilot signal is transmitted at a predetermined frequency different from the frequency of the traffic channel. For packet data transmissions the base station and each mobile station determine a data rate for transmission. In one embodiment the base station determines the data rate and informs the mobile station. In another embodiment, the mobile station determines the data rate and informs the base station. In still another embodiment, the base station and mobile station negotiate a data rate, wherein each provides information to the other. The decision diamond 126 separates the process flow according to where the data rate decision is made. If the mobile station makes the data rate decision, processing continues to step 136. If the mobile station does not make the data rate decision, processing continues to step 128.

In one embodiment, the method for determining a data rate involves negotiation of the mobile station and base station. In the negotiations, the mobile station determines a maximum achievable data rate. The maximum achievable data rate represents a data rate possible if the mobile station is the only receiver of the base station. In this case, the total transmit power available from the base station is dedicated to the mobile station. As illustrated, at step 128 the mobile station receives a Broadcast-to-Pilot ratio, or B/P ratio. The broadcast power is the total transmit power of the base station. The pilot power is the power consumed for transmission of the pilot signal from the base station. The mobile station determines a normalized data rate as a function of the B/P ratio and the pilot SNR at step 130. The normalized data rate corresponds to a data rate the mobile user would request if all of the broadcast power were available for data traffic to the mobile user and the pilot signal, ignoring other users within a system such as system 50 of FIG. 5. In other words, the normalized data rate is the maximum achievable data rate. The normalized data rate is then transmitted to the base station via the Normalized Data Rate Channel (NDRC) at step 132. The base station receives the NDRC from each mobile station and determines corresponding data rates for each mobile user. The data rate indicator is then transmitted to each mobile station at step 134. Processing then continues to step 144 and the mobile receives traffic at the data rate, and finally returns to step 122.

The B/P ratio represents a constant that will typically vary relatively slowly over time. The base station knows the ratio of total broadcast power and the power used for the pilot channel. Alternate embodiments may implement other indicators of the available power, such as using other expression(s) of the energy of transmitted signals, the power spectral density of the signals, etc.

Continuing with FIG. 11, in an alternate method of determining a data rate, the data rate decision is made by the mobile station. For this embodiment, at step 136 the mobile station receives a Traffic-to-Pilot ratio, T/P ratio. At step 138 the mobile station uses the calculated pilot SNR to generate a "traffic SNR" by adjusting the pilot SNR according to the power available for traffic transmissions. In the present embodiment the T/P ratio is used to adjust the pilot SNR. The traffic SNR then reflects the estimated SNR of the traffic transmissions using the available power. The traffic SNR is correlated to a data rate at step 140. The traffic SNR may be correlated to a Carrier-to-Interference (C/I) ratio or other indicator of the quality of the channel. In one embodiment a lookup table stores traffic SNRs and associated data rates. The data rate is then provided as a request to the base station on the Data Request Channel (DRC) at step 142. Processing then continues to step 144.

In an alternate embodiment, the mobile station estimates the T/P ratio using the received pilot signal. The received pilot signal provides a channel estimate used for decoding the traffic information. A low pass filter may be used to filter noise components from the received pilot signal. The filtering provides an estimate of the noise received with the pilot signal. The T/P ratio is then estimated based on the filtering results. As an example, consider a system model described by the following:

$$r_k^t = \sqrt{T}cs_k + n_k^t \quad r_k^p = \sqrt{P}c + n_k^p \text{ for } k=0, 1, \ldots, M-1. \tag{1}$$

wherein $r_k^t$ and $r_k^p$ are the traffic and pilot signals, respectively, received at a mobile station. The channel gain, c is complex. The noise associated with the traffic and pilot are given as $n_k^t$ and $n_k^p$, respectively. The lumped power for the pilot and traffic are given as P and T, respectively. As described $T = E_c^t G_t$ and $P = E_c^p G_p$, wherein $E_c^t$ and $E_c^p$ represent the energy per chip for the traffic and pilot channels, respectively, and wherein $G_t$ and $G_p$ are the corresponding processing gains. Note that noises $n_k^t$ and $n_k^p$ are considered independent due to the orthogonality between different code channels, both with zero mean and variance $N_t$. For the above described system model, an estimate of the traffic-to-pilot ratio is given as:

$$R = \sqrt{\frac{T}{P}}. \tag{2}$$

The Maximum Likelihood (ML) estimate of the traffic-to-pilot ratio may be found using the following estimate:

$$\hat{R} = \frac{\left|\left(\frac{1}{M}\sum_{k=0}^{M-1} s_k^* r_k^t\right)^2 + \left(\frac{1}{M}\sum_{k=0}^{M-1} r_k^p\right)^2 \left(\frac{1}{M}\sum_{k=0}^{M-1} |s_k|^2\right)\right| +}{2\mathrm{Re}\left[\left(\frac{1}{M}\sum_{k=0}^{M-1} s_k^* r_k^t\right)\left(\frac{1}{M}\sum_{k=0}^{M-1} r_k^p\right)^*\right]\left(\frac{1}{M}\sum_{k=0}^{M-1} |s_k|^2\right)} \quad (3)$$

$$\frac{\left|\frac{1}{M}\sum_{k=0}^{M-1} s_k^* r_k^t\right|^2 - \left|\frac{1}{M}\sum_{k=0}^{M-1} r_k^p\right|^2 \left(\frac{1}{M}\sum_{k=0}^{M-1} |s_k|^2\right)}{}$$

After some approximation, (3) reduces to:

$$\hat{R} \approx \left|\frac{1}{M}\sum_{k=0}^{M-1} s_k^* \frac{r_k^t}{\frac{1}{M}\sum_{m=0}^{M-1} r_m^p}\right| \times \frac{1}{\frac{1}{M}\sum_{k=0}^{M-1} |s_k|^2} \quad (4)$$

$$\approx \left|\frac{1}{M}\sum_{k=0}^{M-1} s_k^* \frac{r_k^t}{\frac{1}{M}\sum_{m=0}^{M-1} r_m^p}\right|,$$

wherein the constellation is assumed to have unit averaged power.

The estimates in (3) and (4) may be difficult to evaluate, as the data sequence $\{s_k\}$, representing the transmitted signal, is included in the equations. However, these equations suggest that $$\frac{r_k^t}{\frac{1}{M}\sum_{m=0}^{M-1} r_m^p}$$

is a sufficient statistic that may be used in T/P ratio estimation algorithm design.

According to one embodiment, an algorithm for estimating the T/P ratio first estimates $h=\sqrt{P}c$ with $$\hat{h} = \frac{1}{M}\sum_{m=0}^{M-1} r_m^p$$

and the noise variance $N_t$ from $r_k^p$. Next the algorithm defines an estimate of the T/P ratio as:

$$\hat{R} = \sqrt{\frac{1}{M}\sum_{k=0}^{M-1}\left|\frac{r_k^t}{\hat{h}}\right|^2 - \frac{\hat{N}_t}{|\hat{h}|^2}} \quad (5)$$

$$= \sqrt{\frac{1}{M}\sum_{k=0}^{M-1}\left|\frac{r_k^t}{\frac{1}{M}\sum_{m=0}^{M-1} r_m^p}\right|^2 - \frac{\hat{N}_t}{\left|\frac{1}{M}\sum_{m=0}^{M-1} r_m^p\right|^2}},$$

wherein the estimate of (5) is asymptotically unbiased. Note that an optimal estimate considers the first moment of the test statistics, while the estimate of (5) intends to estimate the second order moment. While both approaches result in unbiased estimates, the second order moment will typically introduce a larger estimation variance. Consider also that using the first order moment, the required data sequence is unavailable, and the mobile station uses a priori the specific format of the constellation.

In another embodiment, a T/P ratio estimation algorithm estimates $h=\sqrt{P}c$ with $$\hat{h} = \frac{1}{M}\sum_{m=0}^{M-1} r_m^p$$

and obtains the empirical probability density function (PDF) of $$x_k = \frac{r_k^t}{\frac{1}{M}\sum_{m=0}^{M-1} r_m^p}.$$

Note that, for sufficiently large M, $x_k$ can be considered approximately Gaussian with mean $Rs_k$. It is then possible to extract an estimate of R from the PDF of $x_k$. At this point there are a variety of ways to estimate R from the PDF of $x_k$. Several properties can be used in extracting the traffic-to-pilot ratio from the PDF. For example, for a high-order modulation such as associated with a high SNR, $x_k$'s are grouped into several clusters. The layout of the centers of the clusters is similar to that of the constellation of $s_k$. For M-PAM, M-QAM and M-PSK, the constellation points are equally spaced. Note also that the distribution of each cluster approximately follows the Gaussian PDF. With source coding, such as compression and/or vocoding, and channel coding the transmitted symbols are equally likely.

The algorithm may continue in the frequency domain or the time domain. For a frequency domain analysis, the points of a constellation may be arranged equally spaced, as are the clusters of the PDF of $x_k$, indicating the PDF is periodic. The space, or period, is then determined by frequency domain analysis. For example, creating a histogram by calculating the DFT of the PDF function, the algorithm then locates the major period. R may be calculated based on the major period and the period between any two constellation points. For M-QAM, the two-dimensional PDF function can be considered as two separate one-dimensional functions. Alternately, the equal spacing property may be exploited in the time domain. For example, by calculation of the auto-correlation function of the PDF, the position of the first side-lobe next to zero offset may provide an estimate of the average period between the center of the two adjacent clusters.

In still another embodiment, the N centers of the clusters of the PDF are first located. This method assumes that the estimated centers are $\{d_k\}$ for k=0, 1, . . . , N−1, and the constellation points $\{a_k\}$ for k=0, 1, . . . , N−1, are in a same order. Application of the least square algorithm results in the following estimate of R $$\hat{R} = \frac{\left|\mathrm{Re}\left[\frac{1}{N}\sum_m a_m d_m^*\right]\right|}{\frac{1}{N}\sum_m |a_m|^2} = \left|\mathrm{Re}\left[\frac{1}{N}\sum_m a_m d_m^*\right]\right| \quad (6)$$

Note that the centers for the PDF function may be determined in a variety of ways.

Since the constellation points are equally likely, the method first finds the Cumulative Probability Function (CDF) from the PDF. The clustering is performed by application of a threshold scheme on the CDF. The center of each group is then calculated by averaging within the group using a first order moment. In alternate embodiments, techniques such as feature extraction used in image processing may be applied, wherein for example, a feature may be a peak or a template based on an approximation to the Gaussian PDF. Note also that image segmentation techniques, such as clustering and region growing, provide methods for grouping the points of the empirical PDF. Comparing (6) and (4) illustrates a similarity between clustering processes and hard-decoding, wherein the actual signal $s_k$ in (4) is replaced by the hard-decoded symbol $a_m$ in (6).

In a typical HDR system, such as system 20 illustrated in FIG. 1, one link is established between the base station at a time. In one embodiment, a wireless communication system is extended to support multiple users at one time. In other words, system 50 of FIG. 5 allows the base station 52 to transmit data to multiple data users of mobile units 56, 58, and 60, concurrently. Note that while four (4) mobile units are illustrated in FIG. 5, there may be any number of mobile units within system 50 communicating with base station 52. Extension to multiple users provides for multiple communications via the packet data channel 54. At a given time, the users supported by the packet data channel are referred to as "active receivers." Each active receiver decodes the signaling message(s) to determine the T/P ratio of the packet data channel 54. Each active receiver processes the T/P ratio without consideration of the potential for other active receiver(s). The base station receives data rate requests from each active receiver and allocates power proportionally.

Returning to FIG. 1, in a conventional HDR communication system, much information is known a priori, including but not limited to, constellation information, encoding scheme, channel identification, and power available for transmission of packet data. Constellation information refers to the modulation scheme with which the digital data information is modulated onto a carrier for transmission. Modulation schemes include, but are not limited to, Binary Phase-Shift Keying, Quadrature Phase-Shift Keying (QPSK), Quadrature Amplitude Mapping (QAM), etc. The encoding scheme encompasses aspects of coding the source information into a digital form, including, but not limited to, Turbo-coding, convolutional coding, error coding, such as Cyclic Redundancy Check (CRC), rate sets, etc. The receiver via the DRC may request the constellation and encoding information. Channel identification includes, but is not limited to, spreading codes in a spread spectrum communication system, such as Walsh codes, and may include the carrier frequency. The channel identification may be predetermined and fixed. The transmission power available for packet data transmission is typically known, based on the known total transmit power available and the known pilot signal power.

In a combination, packet data and low delay data, system some of the above mentioned information is not known a priori, but rather is subject to variation due to the sharing of the available power and available channels with low delay data, such as voice communications. A comparison is made in the following table.

TABLE 1

Information Available in HDR Systems

| | HDR | COMBINATION | COMBINATION |
|---|---|---|---|
| INFORMATION | PACKET DATA ONLY | T/P | SIGNALING CHANNEL |
| Target Recipient | DECODE packet | DECODE packet | Message |
| Constellation | DRC | DRC | DRC |
| Encoding | DRC | DRC | DRC |
| Channel(s) | FIXED | Unknown | Message |
| Traffic Power for Data | FIXED | T/P | Unknown |

The use of a signaling channel, as illustrated in FIG. 8, provides much of this information to the receiver. The message identifies the target recipient(s) and the channel(s) for the packet data transmission. The DRC information requests a data rate, specifying the constellation and the encoding. The provision of the available traffic power indicator, wherein in one embodiment the indicator is a ratio of the available traffic power to the pilot signal strength, provides a measure for determining the data rate. According to one embodiment implementing a separate parallel signaling channel, the information related to target recipient, constellation, and encoding is transmitted via the traffic channel and/or DRC, while the information relating to channel(s) and traffic power for data is transmitted via the parallel signaling channel.

Application of the embodiments and combinations of embodiments described hereinabove, allow for combination of packet data with low delay data transmissions within a wireless communication system. As indicated, the combination of voice with packet data introduces variables into the transmission process. The application of a separate signaling channeling provides information to receivers within a wireless communication system without degrading the quality of the communication. The signaling channel message may identify target recipient(s) information. The transmission of an available traffic indicator to a receiver provides information that assists the receiver in determining a data rate to request from the transmitter. Similarly, when the traffic indicator is used by multiple receivers, wherein each calculates a data rate therefrom, the transmitter receives information that assists the transmitter in allocating transmission channels for packet data transmissions to the multiple receivers.

Thus, a novel and improved method and apparatus for high data rate transmission in a wireless communication system has been described. While the exemplary embodiment discussed herein describes a CDMA system, various embodiments are applicable to any wireless per-user connection method. To effect efficient communications, the exemplary embodiment is described with respect to HDR, but may also be efficient in application to IS-95, W-CDMA, IS-2000, GSM, TDMA, etc.

Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality.

Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a Digital Signal Processor (DSP), an Application Specific Integrated Circuit (ASIC), a Field Programmable Gate Array (FPGA) or other programmable logic device, discrete gate or transistor logic, discrete hardware components such as, e.g., registers and First In First Out (FIFO) type, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in Random Access Memory (RAM), FLASH memory, Read Only Memory (ROM), Electrically Programmable ROM (EPROM) memory, Electrically Erasable Programmable ROM (EEPROM), registers, hard disk, a removable disk, a Compact Disk-ROM (CD-ROM), or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A mobile station comprising:
   a processor configured to:
      receive a broadcast-to-pilot ratio from a base station;
      determine a normalized data rate as a function of the received broadcast-to-pilot ratio and a power of a pilot signal received from the base station; and
   a transmitter configured to transmit the normalized data rate to the base station.

2. The mobile station of claim 1, wherein the processor is further configured to receive a data rate indicator from the base station, the date rate indicator based on the transmitted normalized date rate.

3. The mobile station of claim 2, further comprising:
   a receiver configured to receive traffic from the base station at a date rate indicated by the data rate indicator.

4. A mobile station comprising:
   means for receiving a broadcast-to-pilot ratio from a base station;
   means for determining a normalized data rate as a function of the received broadcast-to-pilot ratio and a power of a pilot signal received from the base station; and
   means for transmitting the normalized data rate to the base station.

5. The mobile station of claim 4 further comprising:
   means for receiving a data rate indicator from the base station, the date rate indicator based on the transmitted normalized date rate.

6. The mobile station of claim 5 further comprising:
   means for receiving traffic from the base station at a date rate indicated by the data rate indicator.

7. A method of operating a mobile station comprising:
   receiving a broadcast-to-pilot ratio from a base station;
   determining, by said mobile station, a normalized data rate as a function of the received broadcast-to-pilot ratio and a power of a pilot signal received from the base station; and
   transmitting, by said mobile station, the normalized data rate to the base station.

8. The method of claim 7 further comprising:
   receiving a data rate indicator from the base station, the date rate indicator based on the transmitted normalized date rate.

9. The method of claim 8 further comprising:
   receiving traffic from the base station at a date rate indicated by the data rate indicator.

10. A non-transitory processor-readable medium memory having instructions thereon executable by a processor, the instructions comprising:
    code for receiving a broadcast-to-pilot ratio from a base station;
    code for determining a normalized data rate as a function of the received broadcast-to-pilot ratio and a power of a pilot signal received from the base stations; and
    code for transmitting the normalized data rate to the base station.

11. A non-transitory processor-readable medium memory of claim 10 further comprising: code for receiving a data rate indicator from the base station, the date rate indicator based on the transmitted normalized date rate.

12. A non-transitory processor-readable medium memory of claim 10 further having comprising: code for receiving traffic from the base station at a date rate indicated by the data rate indicator.

* * * * *